United States Patent
Mori et al.

(10) Patent No.: US 9,976,491 B2
(45) Date of Patent: May 22, 2018

(54) CONTROLLER FOR INTERNAL COMBUSTION ENGINE

(71) Applicant: TOYOTA JIDOSHA KABUSHIKI KAISHA, Toyota-shi, Aichi-ken (JP)

(72) Inventors: Sachio Mori, Mishima (JP); Koshiro Kimura, Susono (JP); Satoshi Tsuda, Susono (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days. days.

(21) Appl. No.: 14/916,638

(22) PCT Filed: Aug. 29, 2014

(86) PCT No.: PCT/IB2014/001647
§ 371 (c)(1),
(2) Date: Mar. 4, 2016

(87) PCT Pub. No.: WO2015/033198
PCT Pub. Date: Mar. 12, 2015

(65) Prior Publication Data
US 2016/0195027 A1 Jul. 7, 2016

(30) Foreign Application Priority Data
Sep. 6, 2013 (JP) ................. 2013-185309

(51) Int. Cl.
*F02B 31/00* (2006.01)
*F02D 9/02* (2006.01)
(Continued)

(52) U.S. Cl.
CPC ............... *F02D 9/02* (2013.01); *F01L 3/06* (2013.01); *F02B 23/104* (2013.01); *F02B 31/06* (2013.01);
(Continued)

(58) Field of Classification Search
CPC .. F02D 9/02; F02D 41/0002; F02D 2009/023; F02D 2041/001; F02B 31/06;
(Continued)

(56) References Cited

U.S. PATENT DOCUMENTS 6,138,639 A * 10/2000 Hiraya ...................... F01L 3/06
                                                         123/295
6,199,534 B1     3/2001 Tokuyasu et al.
(Continued)

FOREIGN PATENT DOCUMENTS

EP        2474714 A1      7/2012
JP    H07-166867 A        6/1995
(Continued)

OTHER PUBLICATIONS

Tschoke, H., et al., "HC-Reduzierung im Warmlauf eines Ottomotors", MTZ Motortechnische Zeitschrift, Vieweg Verlag, Wiesbaden, DE, vol. 66, No. 12 (Dec. 2005), pp. 994-999 (7 pages).

*Primary Examiner* — Hai Huynh
(74) *Attorney, Agent, or Firm* — Hunton Andrews Kurth LLP

(57) ABSTRACT

Provided is an internal combustion engine including a sparkplug disposed in the vicinity of the center portion of an upper wall surface of a combustion chamber. Tumble flow generated during lean burn operation is controlled such that the tumble flow shape changes according to the engine rotation speed between a first tumble shape (usual tumble shape) in which the flow direction of a gas around the sparkplug at the time of ignition is direction from an intake valve side toward an exhaust valve side in a latter half of a compression stroke, and a second tumble shape (ω tumble shape) in which the flow direction of the gas is reversed in the latter half of the compression stroke from the direction from the intake valve side toward the exhaust valve side to (Continued)

the direction from the exhaust valve side toward the intake valve side.

14 Claims, 23 Drawing Sheets

(51) Int. Cl.
| | |
|---|---|
| *F02B 23/10* | (2006.01) |
| *F02B 31/08* | (2006.01) |
| *F01L 3/06* | (2006.01) |
| *F02B 31/06* | (2006.01) |
| *F02D 41/00* | (2006.01) |
| *F02P 13/00* | (2006.01) |
| *F01L 13/00* | (2006.01) |
| *F01L 1/053* | (2006.01) |
| *F01L 9/04* | (2006.01) |

(52) U.S. Cl.
CPC ........ *F02B 31/085* (2013.01); *F02D 41/0002* (2013.01); *F02P 13/00* (2013.01); *F01L 13/0015* (2013.01); *F01L 2009/0411* (2013.01); *F02B 2023/106* (2013.01); *F02B 2275/48* (2013.01); *F02D 2009/023* (2013.01); *F02D 2041/001* (2013.01); *Y02T 10/125* (2013.01); *Y02T 10/146* (2013.01)

(58) Field of Classification Search
CPC .. F02B 31/085; F02B 23/104; F02B 2275/48; F02B 2023/106; F02B 2023/107; F02B 2023/108; F02P 13/00; F01L 3/06; F01L 2009/0411; F01L 2001/0537; F01L 13/0015; Y02T 10/125; Y02T 10/146
USPC ......................................... 123/298, 301, 302
See application file for complete search history.

(56) References Cited

U.S. PATENT DOCUMENTS

| | | | |
|---|---|---|---|
| 6,336,438 B1 * | 1/2002 | Durnholz | F02B 23/0618 123/301 |
| 6,390,059 B1 * | 5/2002 | Shiraishi | F02B 17/005 123/298 |
| 6,672,277 B2 * | 1/2004 | Yasuoka | F02B 17/005 123/295 |
| 6,684,848 B2 * | 2/2004 | Saito | F02B 17/005 123/295 |
| 8,534,243 B2 * | 9/2013 | Durando | F01L 9/025 123/308 |
| 9,046,031 B2 * | 6/2015 | Kaneko | F02B 23/105 |
| 2002/0078919 A1 | 6/2002 | Yasuoka et al. | |
| 2011/0146620 A1 | 6/2011 | Kaneko | |

FOREIGN PATENT DOCUMENTS

| | | |
|---|---|---|
| JP | H09-264149 A | 10/1997 |
| JP | 2001-003755 A | 1/2001 |
| JP | 2004-257305 A | 9/2004 |
| JP | 2005-171815 A | 6/2005 |
| JP | 2008-303798 A | 12/2008 |
| JP | 2009-041397 A | 2/2009 |
| JP | 2011-236859 A | 11/2011 |
| JP | 2012-021501 A | 2/2012 |
| JP | 2012-246896 A | 12/2012 |
| JP | 2015-072003 A | 4/2015 |
| WO | 2015/033205 A1 | 3/2015 |

* cited by examiner

USUAL TUMBLE SHAPE (CENTRAL CROSS SECTIONS)

ω TUMBLE SHAPE (CENTRAL CROSS SECTIONS)

MEASUREMENT POSITION

INTAKE STROKE

COMPRESSION STROKE

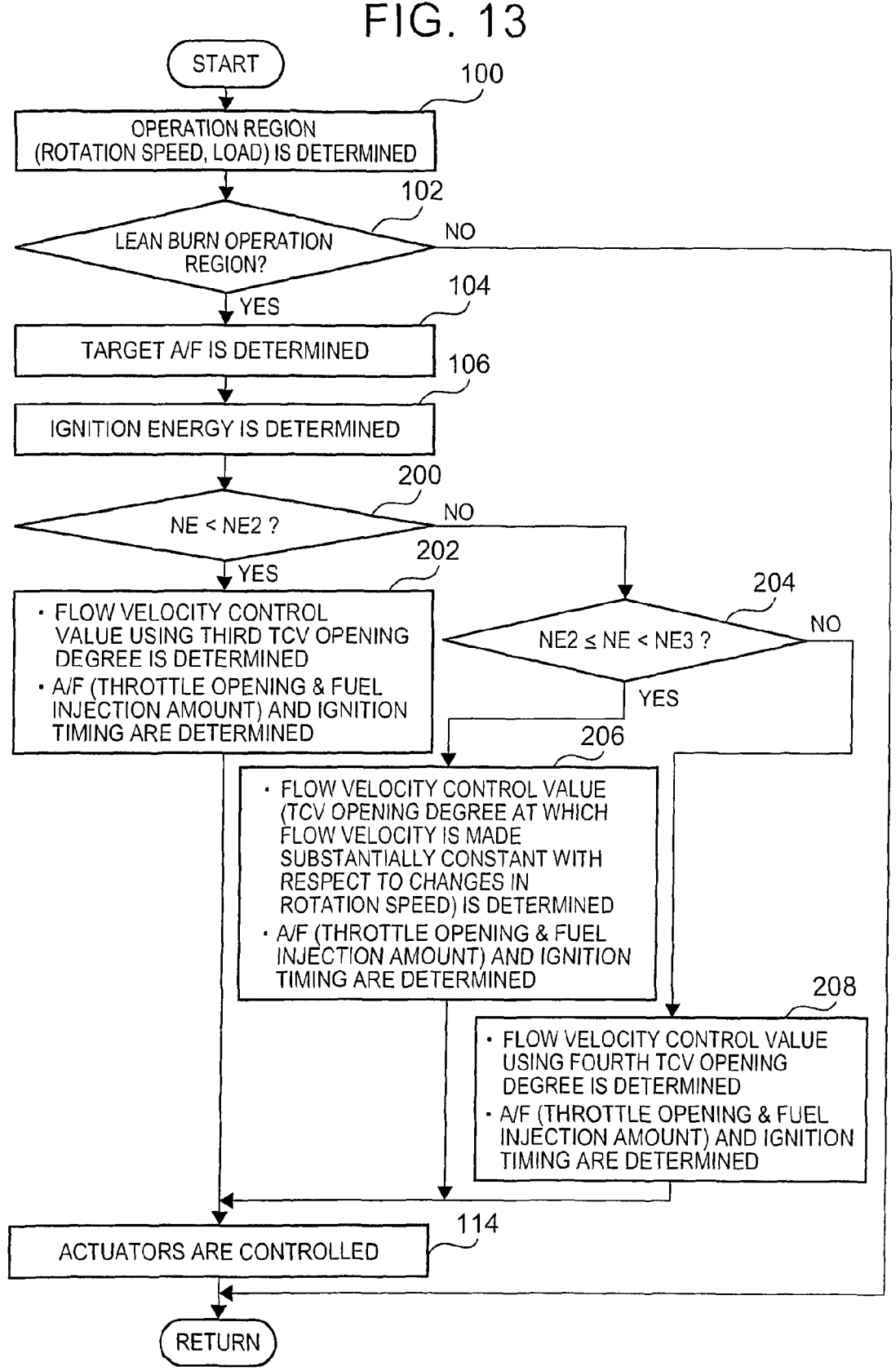

INTAKE STROKE

CONTROLLER FOR INTERNAL COMBUSTION ENGINE

CROSS-REFERENCE TO RELATED APPLICATIONS

This is a national phase application based on the PCT International Patent Application No. PCT/I62014/001647 filed Aug. 29, 2014, claiming priority to Japanese Patent Application No. 2013-185309 filed Sep. 6, 2013, the entire contents of both of which are incorporated herein by reference.

BACKGROUND OF THE INVENTION

1. Field of the Invention

The invention relates to a controller for an internal combustion engine, and more particularly to a controller for an internal combustion engine of a spark ignition type.

2. Description of Related Art

Japanese Patent Application Publication No. 2012-021501 (JP 2012-021501 A) discloses a controller for an internal combustion engine equipped with a tumble flow control valve that generates tumble flow inside a cylinder. In such conventional controller, an estimated tumble ratio is calculated on the basis of a detection value of a first air flow meter provided upstream of a throttle valve and a detection value of a second air flow meter provided directly below the tumble control valve (TCV). The opening degree of the TCV is feedback controlled such that the calculated estimated tumble ratio follows the target tumble ratio. The target tumble ratio is set to within an allowed control range for avoiding misfire and combustion instability.

Although the tumble ratio (ratio of the flow velocity of the tumble flow to the engine rotation speed) is controlled to within a fixed range, where the engine rotation speed changes the velocity of the tumble flow also changes. During lean burn operation conducted under the condition of a low fuel concentration in an air-fuel mixture, such as operation at an air-fuel ratio (A/F) higher than the stoichiometric ratio or exhaust gas recirculation (EGR) operation in which air containing a large amount of EGR gas is burned, the gas flow velocity around the sparkplug at the time of ignition is either too high or too low, and stable ignition is difficult to obtain.

SUMMARY OF THE INVENTION

With consideration for the above-described problems, the invention provides a controller for an internal combustion engine that contributes to the improvement of ignition of an air-fuel mixture during lean burn operation conducted under the condition of a low fuel concentration in the air-fuel mixture.

An aspect of the invention provides a controller for an internal combustion engine which includes a combustion chamber and a sparkplug. The sparkplug is disposed in the vicinity of a center portion of an upper wall surface of the combustion chamber and serves to ignite an air-fuel mixture. In the internal combustion engine tumble flow is generated inside a cylinder of the combustion chamber during lean burn operation. The controller for the internal combustion engine is provided with an electronic control unit. The electronic control unit is configured to change a shape of the tumble flow between a first tumble shape and a second tumble shape according to an engine rotation speed, the first tumble shape being provided such that flow direction of gas around the sparkplug at the time of ignition of the internal combustion engine is direction from an intake valve side toward an exhaust valve side in a latter half of a compression stroke, and the second tumble shape being provided such that the flow direction of the gas is reversed in the latter half of the compression stroke from the direction from the intake valve side toward the exhaust valve side to direction from the exhaust valve side toward the intake valve side due to change to the tumble flow having two swirling flow components with mutually opposite rotation directions, as viewed from above the combustion chamber, in a process in which the in-cylinder gas is compressed in the compression stroke.

When the tumble flow with the second tumble shape is generated, the gas flow velocity around the sparkplug starts decreasing in the compression stroke at a timing earlier than that in the case in which the tumble flow with the first tumble shape is generated, and the direction of the gas flow is soon reversed. Accordingly, with the controller of the above-described configuration, the gas flow velocity around the sparkplug at the time of ignition can be controlled by changing the shape of the tumble flow between the first tumble shape such that the gas flow direction around the sparkplug is not reversed in the latter half of the compression stroke and the second tumble shape such that the gas flow direction is reversed according to the engine rotation speed. As a result, it is possible to provide a controller for an internal combustion engine that improves the ignition ability of an air-fuel mixture in lean burn operation performed under the condition of low fuel concentration in the air fuel mixture.

In the controller, the electronic control unit may be configured to control gas flow velocity around the sparkplug at the time of ignition to within a predetermined flow velocity range by changing the shape of the tumble flow between the first tumble shape and the second tumble shape according to the engine rotation speed.

With the controller of the above-described configuration, the gas flow velocity around the sparkplug at the time of ignition can be controlled to within a range suitable for ignition, regardless of the engine rotation speed.

In the controller, the electronic control unit may be configured to change the shape of the tumble flow to the first tumble shape in a first engine rotation speed region, and the electronic control unit may be configured to change the shape of the tumble flow to the second tumble shape in a second engine rotation speed region, the second engine rotation speed region being an engine rotation speed region higher than the first engine rotation speed region.

The flow velocity of gas flowing into a cylinder is proportional to the engine rotation speed. Therefore, when no control is performed with respect to the gas flow velocity around the sparkplug at the time of ignition, the gas flow velocity increases monotonously proportionally to the engine rotation speed. Accordingly, with the controller of the above-described configuration, in the first engine rotation speed region, the decrease in the gas flow velocity around the sparkplug at the time of ignition can be suppressed by selecting the first tumble shape and suppressing the generation of the flow with the second tumble shape, whereas in the second engine rotation speed region on the high rotation side, the decrease in the gas flow velocity around the sparkplug at the time of ignition can be suppressed by selecting the second tumble shape.

Further, in the controller, the electronic control unit may be configured to change the shape of tumble flow to the second tumble shape by increasing a drift of a vortex center of tumble flow in the vicinity of a cross section passing through a cylinder bore center of the combustion chamber in an intake-exhaust direction in a latter half of a compression stroke of the internal combustion engine with respect to a volume center of the combustion chamber.

Further, in the controller, the electronic control unit may be configured to increase the drift with respect to a volume center of the combustion chamber as the engine rotation speed is high, when the second tumble shape is generated in the second engine rotation speed region.

With the controller of the above-described configuration, the tumble flow with the second tumble shape can be generated by increasing the drift, with respect to the volume center of the combustion chamber, of the vortex center of the tumble flow in the vicinity of the cross section passing through the cylinder bore center in the intake-exhaust direction in the latter half of the compression stroke.

Further, in the controller, the electronic control unit may be configured to change the shape of the tumble flow to the second tumble shape by increasing a ratio of a flow rate of an intake gas from an intake port toward a center portion of the combustion chamber in the flow rate of the intake gas flowing into the combustion chamber in an intake stroke of the internal combustion engine.

With the controller of the above-described configuration, the tumble flow with the second tumble shape can be generated by increasing the ratio of the flow rate of the intake gas from the intake port toward the center portion of the combustion chamber in a flow rate of the intake gas flowing into the combustion chamber in the intake stroke.

In the controller, the internal combustion engine may be provided with an intake variable valve device, the intake variable valve device changing a lift amount of the intake valve. A protrusion may be provided on a wall surface of the combustion chamber so as to surround an outlet of the intake port, except a zone on a central side of the combustion chamber. The electronic control unit may be configured to control the intake variable valve device so that when the engine rotation speed is high, the lift amount of the intake valve is less compared with the lift amount of the intake valve when the engine rotation speed is low.

In the controller, the electronic control unit may be configured to control the intake variable valve device so that when the engine rotation speed is high, the lift amount of the intake valve is a predetermined lift amount less compared with the lift amount of the intake valve when the engine rotation speed is low. Further, the electronic control unit may be configured to control the intake variable valve device so that when the engine rotation speed is high, the lift amount of the intake valve continuously decreases to a lift amount less compared with compared with the lift amount of the intake valve when the engine rotation speed is low, as the engine rotation speed increases.

When the lift amount of the intake valve is small, the flow of the intake gas toward the center of the combustion chamber is facilitated by the protrusion by comparison with that when the lift amount is large. As a result, the generation of the tumble flow with the second tumble shape is facilitated. Therefore, with the above-described controller, where the engine rotation speed is low, the decrease in gas flow velocity around the sparkplug at the time of ignition can be inhibited by suppressing the generation of the tumble flow with the second tumble shape. Meanwhile, where the engine rotation speed is high, the gas flow velocity around the sparkplug at the time of ignition can be controlled. As a result, the gas flow velocity around the sparkplug at the time of ignition can be controlled to within the range suitable for ignition, regardless of the engine rotation speed.

Further, in the controller, the internal combustion engine may be provided with an intake variable valve device, the intake variable valve device changing a lift amount of the intake valve. A protrusion may be provided on a wall surface of the combustion chamber so as to surround an outlet of the intake port in a zone on a central side of the combustion chamber. The electronic control unit may be configured to control the intake variable valve device so that when the engine rotation speed is high, the lift amount of the intake valve is larger compared with the lift amount of the intake valve when the engine rotation speed is low.

In the controller, the electronic control unit may be configured to control the intake variable valve device so that when the engine rotation speed is high, the lift amount of the intake valve is a predetermined lift amount that is larger compared with the lift amount of the intake valve when the engine rotation speed is low. Further, in the controller, the electronic control unit may be configured to control the intake variable valve device so that when the engine rotation speed is high, the lift amount of the intake valve continuously increases to a lift amount larger compared with the lift amount of the intake valve when the engine rotation speed is low, as the engine rotation speed increases.

With the above-described controller, when the lift amount of the intake valve is large, the flow of the intake gas toward the center of the combustion chamber is facilitated by the protrusion by comparison with that when the lift amount is small. As a result, the generation of the tumble flow with the second tumble shape is facilitated. Therefore, with the above-described controller, where the engine rotation speed is low, the decrease in gas flow velocity around the sparkplug at the time of ignition can be inhibited by suppressing the generation of the tumble flow with the second tumble shape. Meanwhile, where the engine rotation speed is high, the increase in gas flow velocity around the sparkplug at the time of ignition can be inhibited by generating the tumble flow with the second tumble shape. As a result, the gas flow velocity around the sparkplug at the time of ignition can be controlled to within the range suitable for ignition, regardless of the engine rotation speed.

In the controller, the second tumble shape may be generated when a reversal timing of the gas flow direction is after the ignition timing of the sparkplug. The internal combustion engine may be provided with an intake variable valve device. The intake variable valve device may configured to change a time period with the maximum valve lift among the valve lift amounts of the intake valve. The electronic control unit may be configured to control the intake variable valve device so that when the engine rotation speed is high, the time period with the maximum valve lift is shorter compared with the time period with the maximum valve lift when the engine rotation speed is low.

In the controller, the electronic control unit may be configured to control the intake variable valve device so that when the engine rotation speed is high, the time period with the maximum valve lift is a predetermined period of time shorter compared with the time period with the maximum valve lift when the engine rotation speed is low. Further, in the controller, the electronic control unit may be configured to control the intake variable valve device so that when the engine rotation speed is high, the time period with the maximum valve lift continuously decreases, as the engine rotation speed increases, to a period of time that is shorter compared with the time period with the maximum valve lift when the engine rotation speed is low.

Where the time period with the maximum valve lift of the intake valve is extended, the intake gas easily flows into the cylinder in a dispersed state, without forming a mass. Meanwhile, where the time period with the maximum valve lift of the intake valve is shortened, the intake gas easily flows into the cylinder as a concentrated mass. Where the intake gas flows into the cylinder as a concentrated mass, the tumble flow with the second tumble shape is easily generated. Accordingly, with the above-described controller, where the engine rotation speed, at which the time period with the maximum valve lift is controlled to a relatively long value, is low, the generation of the tumble flow with the second tumble shape is suppressed, thereby making it possible to suppress the decrease of the gas flow velocity around the sparkplug at the time of ignition. Meanwhile, where the engine rotation speed, at which the time period with the maximum valve lift is controlled to a relatively small value, is high, the generation of the tumble flow with the second tumble shape is suppressed, thereby making it possible to suppress the increase of the gas flow velocity around the sparkplug at the time of ignition. As a result, the gas flow velocity around the sparkplug at the time of ignition can be controlled to within a range suitable for ignition, regardless of the engine rotation speed.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 13 is a flowchart of the routine executed in Embodiment 2;

DETAILED DESCRIPTION OF EMBODIMENTS

Figure 1:
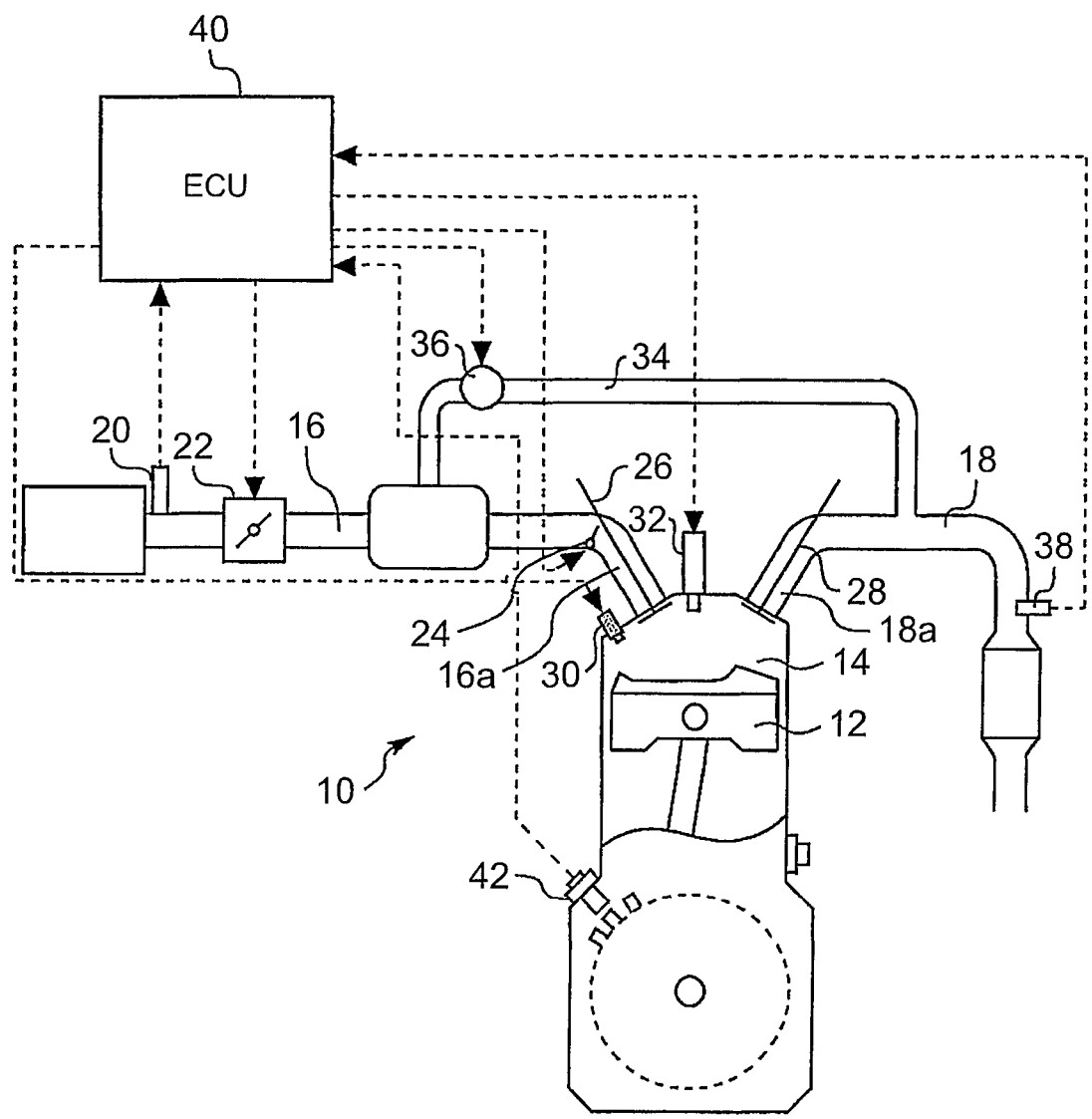
FIG. 1 is a schematic diagram for explaining the system configuration of an internal combustion engine of Embodiment 1 of the invention.

The system configuration of Embodiment 1 of the invention is explained below. FIG. 1 is a schematic diagram illustrating the system configuration of an internal combustion engine 10 of Embodiment 1. The system of the embodiment is provided with the internal combustion engine 10 of a spark ignition type. A piston 12 is provided in each cylinder of the internal combustion engine 10. A combustion chamber 14 is formed at the top side of the piston 12 inside the cylinder. An intake passage 16 and an exhaust passage 18 communicate with the combustion chamber 14.

An air flow meter 20 that outputs a signal corresponding to the flow rate of air taken into the intake passage 16 is provided close to the inlet of the intake passage 16. An electronically controlled throttle valve 22 is provided downstream of the air flow meter 20. An electronically controlled TCV 24 is provided in the intake passage 16 after the passage has been branched toward each cylinder. The TCV 24 generates tumble flow (vertical vortex flow) by generating a drift in the flow of air inside an intake port 16a. Thus, the TCV 24 is an actuator affecting the gas flow inside the cylinder. By changing the opening degree of the TCV 24, it is possible to adjust the tumble ratio (ratio of the angular velocity of the tumble flow to the engine rotation speed) of the tumble flow.

An intake valve 26 that opens and closes the intake port 16a is provided in the intake port 16a of the intake passage 16, and an exhaust valve 28 that opens and closes an exhaust port 18a is provided in the exhaust port 18a of the exhaust passage 18. A fuel injection valve 30 for directly injecting fuel into the cylinder is provided in each cylinder of the internal combustion engine 10. A sparkplug 32 of an igniter (not shown in the figure) for igniting the air-fuel mixture is also provided inside each cylinder. More specifically, the sparkplug 32 is disposed close to the center portion of the upper wall surface (that is, the wall surface on the cylinder head side) of the combustion chamber 14. Further, as shown in the below-described FIGS. 6A and 6B, two intake valves 26 are provided adjacently in each cylinder, and two exhaust valves 28 are provided adjacently to each other and opposite the intake valves 26, with the sparkplug 32 being interposed between the intake valves and the exhaust valves.

The internal combustion engine 10 is provided with an EGR passage 34 connecting the intake passage 16 to the exhaust passage 18. An EGR valve 36 for adjusting the amount of EGR gas (external EGR gas) that flows back to the intake passage 16 through the EGR passage 34 is disposed in the intermediate section of the EGR passage 34. By changing the opening degree of the EGR valve 36, it is possible to change the flow rate of the exhaust gas (EGR gas) flowing in the EGR passage 34 and adjust an EGR ratio. An A/F sensor 38 for detecting the A/F of the exhaust gas is disposed in the exhaust passage 18.

The system shown in FIG. 1 is also provided with an electronic control unit (ECU) 40. In addition to the above-mentioned air flow meter 20 and the A/F sensor 38, various sensors for detecting the operation state of the internal combustion engine 10, such as a crank angle sensor 42 for detecting the engine rotation speed, are connected to the input unit of the ECU 40. Various actuators for controlling the operation of the internal combustion engine 10, such as the abovementioned throttle valve 22, the TCV 24, the fuel injection valve 30, the sparkplug 32, and the EGR valve 36, are connected to the output unit of the ECU 40. The ECU 40 performs the predetermined engine control such as fuel injection control and ignition control, and also the below-described tumble flow control by actuating the actuators according to the abovementioned sensors and a predetermined program.

Figure 2:
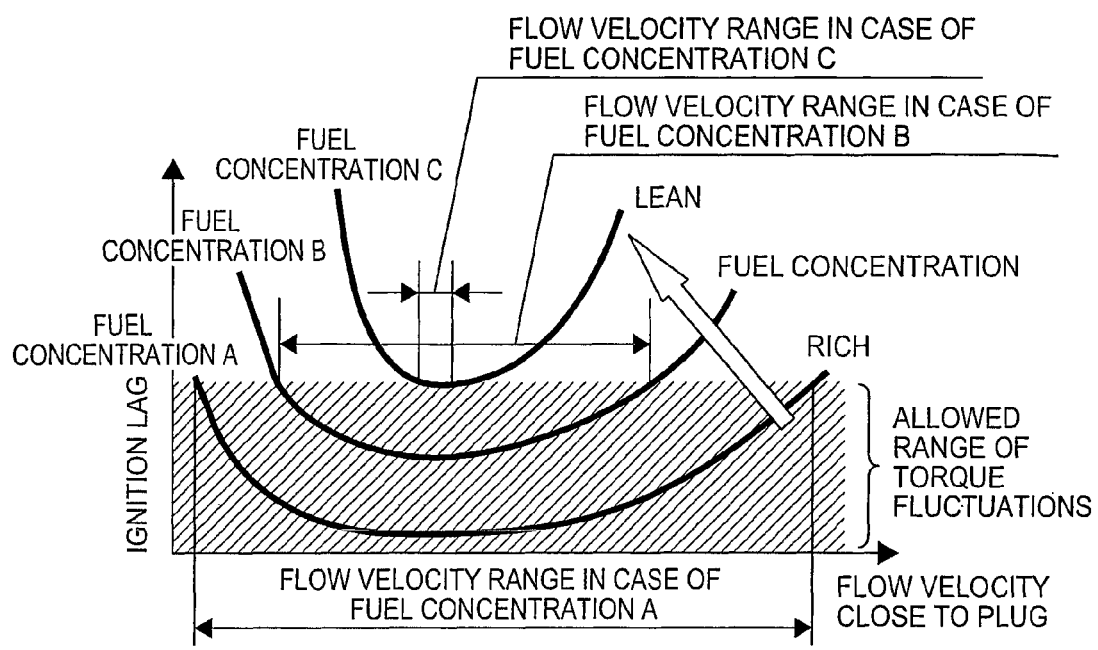
FIG. 2 represents the relationship between the ignition lag of an air-fuel mixture, a gas flow velocity around a sparkplug, and the fuel concentration of an air-fuel mixture.

The necessity of controlling the gas flow velocity around a sparkplug at the time of ignition in lean burn operation is explained below. FIG. 2 represents the relationship between the ignition lag of an air-fuel mixture, gas flow velocity around the sparkplug 32, and fuel concentration in the air-fuel mixture. The operation region of the internal combustion engine 10 includes a lean burn operation region in which operation is performed under the condition of a low fuel concentration in the air fuel mixture. Where the level of fuel concentration in the air-fuel mixture is explained in the description, it is assumed that when the EGR gas is introduced, not only the air, but also the EGR gas is included in the air-fuel mixture, that is, that not only the taken-in air, but also the EGR gas is present therein. In greater detail, it can be said that the lean burn operation is performed under the conditions such that the fuel concentration of the air-fuel mixture is lower than that under standard conditions of operation at a stoichiometric ratio and a zero EGR ratio by increasing the amount of air or the amount of EGR gas over those under the standard conditions. In other words, the lean burn operation is performed under the condition such that the fuel concentration of the A/F is equal to or less than a predetermined value (the condition under which the degradation of ignition ability of the A/F (ignition lag) is a concern). The lean burn operation region is specified by the engine rotation speed and engine load.

Therefore, the lean burn operation, as referred to in the description, is inclusive not only of the operation performed under an A/F higher than the stoichiometric ratio (that is, the operation in which the fuel concentration is diluted by increasing the ratio of the air amount in relation to the fuel amount), but also of the operation performed under a high EGR ratio created by the introduction of a large amount of the EGR gas (that is, the operation performed by diluting the fuel concentration by increasing the ratio of the EGR gas amount in relation to the fuel amount). The operation performed with the A/F in the vicinity of the stoichiometric ratio can be also included in such operation under a high EGR ratio.

In the lean burn operation that attains a high thermal efficiency, it is important to advance the transition to a leaner fuel concentration in the air-fuel mixture inside the cylinder and reduce the amount of NOx discharged from the internal combustion engine 10. However, during the lean burn operation (in particular, during homogeneous lean burn combustion performed by forming a lean air-fuel mixture uniformly in the entire interior of the cylinder, as in the internal combustion engine 10 of the embodiment), the transition to an excessively lean fuel concentration can destabilize the combustion.

As shown in FIG. 2, during the lean burn operation, the ignition lag of the air-fuel mixture increases with the decrease in fuel concentration. Where the ignition lag increases, torque fluctuations in the internal combustion engine 10 increase. Further, the ignition lag changes according to the gas flow velocity around the sparkplug 32 (referred to hereinbelow as "flow velocity close to the plug") at the time of ignition (within the discharge period of time of the sparkplug 32). Therefore, in order to fit the ignition lag into a range in which torque fluctuations are at an allowed level and to obtain stable combustion, it is necessary to fit the flow velocity close to the plug at the time of ignition into a fixed range. The predetermined flow velocity range for the flow velocity close to the plug gets narrower as the fuel concentration decreases, as shown in FIG. 2.

Figure 3:
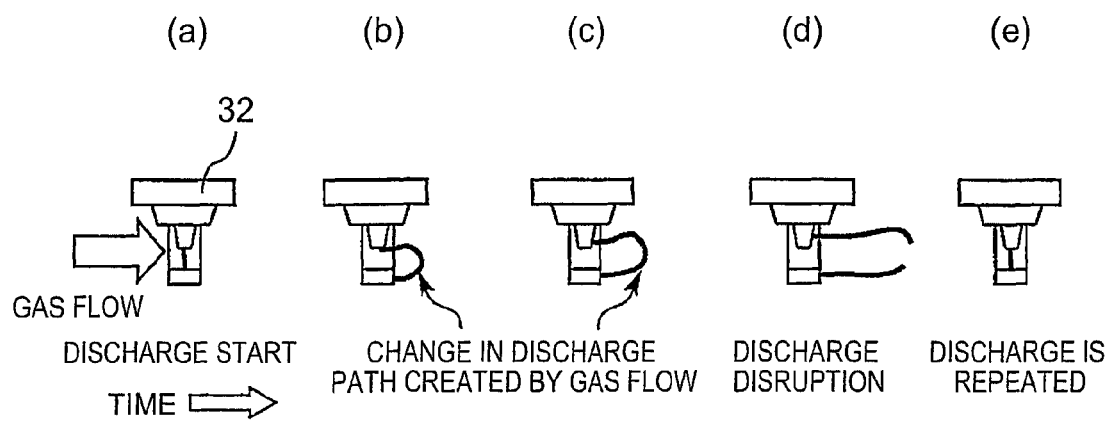
FIG. 3 shows in a time sequence the behavior of a discharge spark within the discharge period of time in the case in which a discharge disruption has occurred in the internal combustion engine.

The relationship between the ignition lag and the flow velocity close to the plug is such that the ignition lag increases as the flow velocity changes to the higher flow velocity side and lower flow velocity side with respect to a certain flow velocity value (optimal value). The reason why the ignition lag increases on the higher flow velocity side and lower flow velocity side will be explained below with reference to FIG. 3. FIG. 3 shows in a time sequence the behavior of a discharge spark within the discharge period of time in the case in which a discharge disruption has occurred.

As shown in FIG. 3(a), after a discharge has started, an electric spark that has occurred in a plug gap is caused to flow by the gas flow around the sparkplug 32, as shown in FIGS. 3(b) and 3(c). As a result, the discharge path length increases. Where the discharge occurs, the electric resistance decreases due to the ionization of gas on the discharge spark path. However, where the discharge path length increases too much due to a high flow velocity close to the plug, the electric resistance value on the discharge path increases over that at the shortest distance in the plug gap, and the discharge disruption occurs as shown in FIG. 3(d). Where the discharge disruption occurs, discharge is immediately performed again at the shortest distance in the plug gap, as shown in FIG. 3(e).

The reason for the ignition performance degrading on the high flow velocity side is the first to be explained below. At a fuel concentration close to a lean limit, a certain time is required for the air-fuel mixture to reach the ignition stage (till a chemical reaction is started). Where the flow velocity close to the plug increases, the time till the discharge is disrupted is shortened. Therefore, the time till the same A/F at a certain position is heated by the electric spark and the ignition stage is reached is insufficient. As a result, the ignition performance is degraded.

The reason for the ignition performance degrading on the low flow velocity side is next to be explained. Energy per unit length of an electric spark created by an electric discharge is determined by characteristics of an ignition coil and is constant regardless of the discharge path length. Therefore, where the discharge path length is increased by a gas flow or the like, the energy supplied to the entire air-fuel mixture increases and the volume of the heated air-fuel mixture also increases. However, where the flow velocity close to the plug decreases, the discharge path is unlikely to extend. Therefore, neither the supplied energy nor the air-fuel mixture volume is increased. As a result, the ignition performance is degraded.

As indicated hereinabove, in order to fit the ignition lag into a range in which torque fluctuations are at an allowed level and to obtain stable combustion, it is necessary to fit the flow velocity close to the plug at the time of ignition into a fixed range. However, the flow velocity of the gas flowing into the cylinder is proportional to the engine rotation speed. Therefore, when no control is performed with respect to the flow velocity close to the plug, the flow velocity close to the plug increases monotonously proportionally to the engine rotation speed as shown by a broken line in the below-described FIG. 9. Accordingly, in the embodiment, the flow velocity close to the plug at the time of ignition in the lean burn operation region is controlled using a change of the shape of the tumble flow generated inside the cylinder. More specifically, the tumble flow shape is changed between a usual tumble shape (also referred to as "first tumble shape") and a ω tumble shape which is defined hereinbelow (also referred to as "second tumble shape").

Figure 4A:
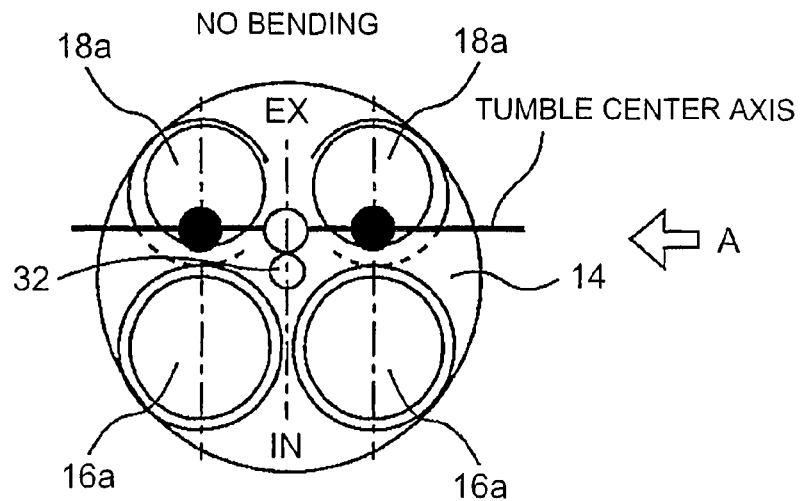
FIGS. 4A, 4B, and 4C serve to explain the specific features realized when the tumble flow generated in a cylinder has the usual tumble shape in the internal combustion engine.
Figure 4B:
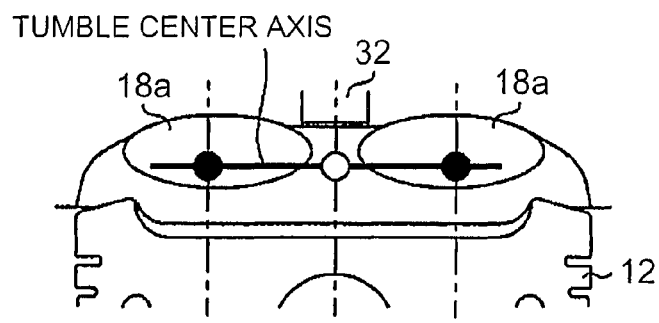
Figure 4C:
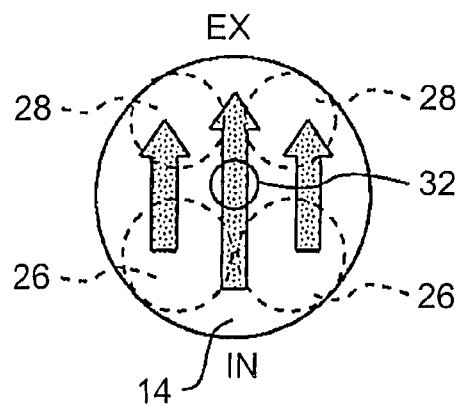
Figure 5A:
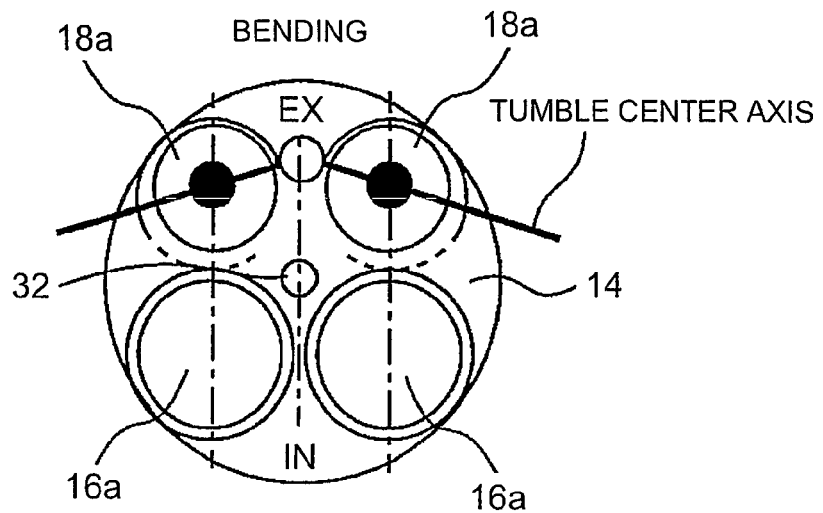
FIGS. 5A, 5B, and 5C serve to explain the specific features realized when the tumble flow generated in a cylinder has the ω tumble shape in the internal combustion engine.
Figure 5B:
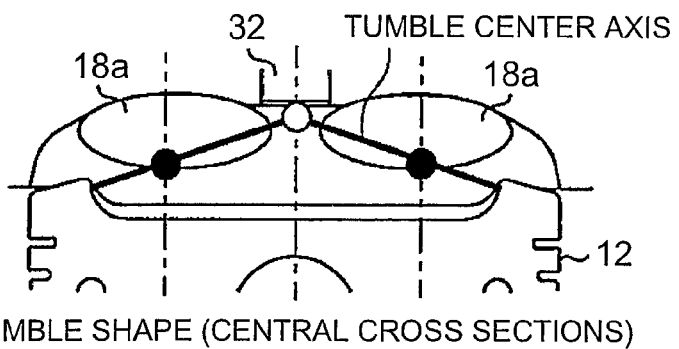
Figure 5C:
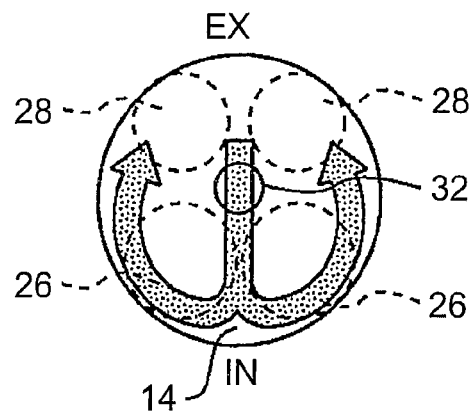

The generation mechanism of the tumble flow with the ω tumble shape is explained below. FIGS. 4A to 4C illustrate specific features of the usual tumble shape. FIGS. 5A to 5C illustrate specific features of the ω tumble shape. More specifically, FIGS. 4A and 5A are plan views of the combustion chamber 14 taken from above. FIGS. 4B and 5B are side views of the combustion chamber 14 taken from the intake side. FIGS. 4C and 5C show the flow direction of the tumble flow with the usual tumble shape and the ω tumble shape, respectively, when the combustion chamber 14 is viewed from above. FIGS. 4A to 4C and FIGS. 5A to 5C correspond to a timing close to the compression top dead center in a compression stroke.

The basic rotation direction of the tumble flow generated inside a cylinder is a clockwise direction in FIG. 1, that is, the direction in which the gas flowing from the intake port 16a into the cylinder flows toward the top surface of the combustion chamber 14, wall surface inside the cylinder on the exhaust valve 28 side, top surface of the piston 12, wall surface inside the cylinder on the intake valve 26 side, and top surface of the combustion chamber 14, in the order of description. A tumble center axis, which is discussed hereinbelow, is obtained by connecting the vortex center points of the tumble flow in the cross-sections of the combustion chamber 14 viewed from the direction of the arrow (A) in FIG. 4A. White round symbols in FIGS. 4A to 4C and FIGS. 5A to 5C denote the vortex center points of the tumble flow in a cross section (cross section in the intake-exhaust direction) passing through the center of the cylinder bore where the sparkplug 32 is disposed, and black round symbols in the same figures denote the vortex center points of the tumble flow in a cross section passing through the axial centers of the intake valve 26 and the exhaust valve 28.

The tumble center axis of the usual tumble shape is a bend-free axis horizontal with respect to the cylinder, as shown in FIGS. 4A and 4B. Therefore, the flow with the usual tumble shape becomes a uniform flow from the intake side toward the exhaust side, as shown in FIG. 4C, even in the latter half of the compression stroke. By contrast, the tumble center axis of the ω tumble shape is a bent axis for which the vortex center of the tumble flow in the cylinder bore center (it is also the sparkplug position) is a bending point, as shown in FIGS. 5A and 5B. More specifically, in the case of the ω tumble shape, the vortex center position (shown by a white circle symbol) of the tumble flow in the cross section passing through the cylinder bore center rises with respect to the vortex center position on the periphery thereof, as shown in FIG. 5B. Even more specifically, in the vicinity of the compression top dead center, a drift from the horizontal to the upward direction with respect to the volume center of the combustion chamber 14 occurs at the vortex center position of the tumble flow in the cross section passing through the cylinder bore center. Such a drift is referred to hereinbelow simply as "the drift of the vortex center of the tumble flow". Therefore, in such a case, tumble flow that essentially should be a single rigid vortex inside a cylinder changes into tumble flow (tumble flow having two swirling flow (transverse vortex flow) components with mutually different rotation directions, as viewed from above the combustion chamber 14) having two center axes due to bending of the tumble center axis in the process in which the in-cylinder gas is compressed in the compression stroke. As a result, with the ω tumble shape, the flow assumes the ω shape, as viewed from above the combustion chamber 14, in the vicinity of the compression top dead center, as shown in FIG. 5C. When such an ω-shaped flow is generated, the flow direction of the gas around the sparkplug 32 is reversed in the vicinity of the compression top dead center in the compression stroke.

Furthermore, in the intake stroke, bending occurs in the tumble center axis in both the usual tumble shape and the ω tumble shape. In the case in which the bending of the tumble center axis remains in the vicinity of the compression top dead center, the ω tumble shape is obtained, and in the case in which the bending of the tumble center axis disappears in the compression stroke, the usual tumble shape is obtained.

Figure 6A:
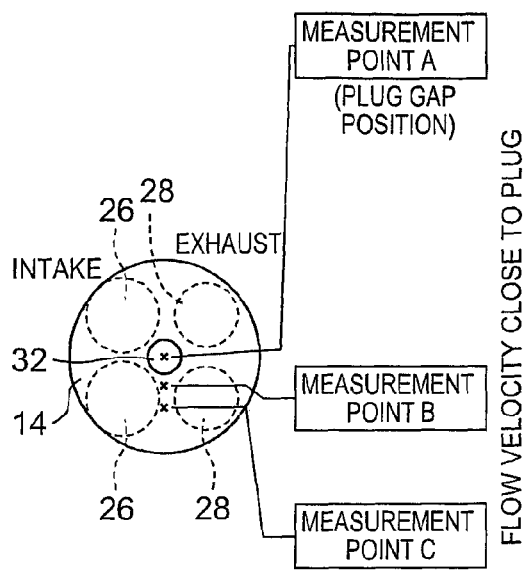
FIGS. 6A and 6B represent changes in gas flow velocity inside a cylinder in the latter half of a compression stroke when the tumble flow with the ω tumble shape is generated.
Figure 6B:
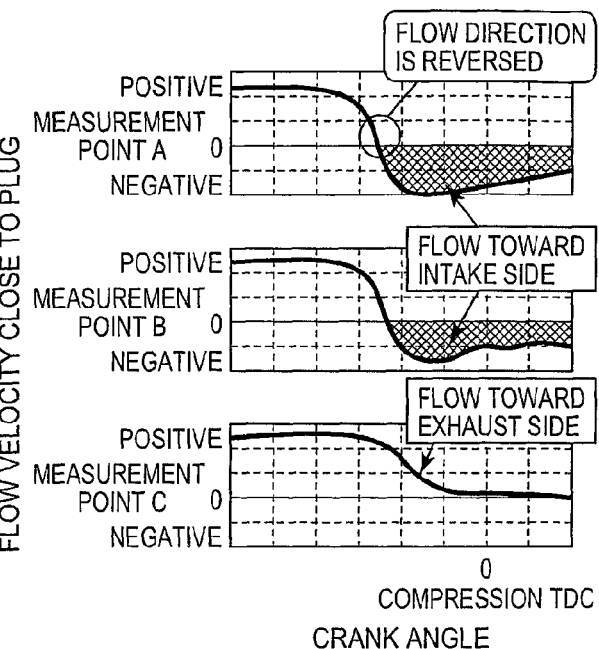

FIGS. 6A and 6B represent changes in gas flow velocity insides the cylinder in the latter half of the compression stroke when the tumble flow with the ω tumble shape has occurred. More specifically, the graph in the upper portion of FIG. 6B shows changes in gas flow velocity in a measurement point A. The measurement point A is a plug gap position. The graph in the intermediate portion of FIG. 6B shows changes in gas flow velocity at a predetermined position radially outside of the cylinder bore with respect to the measurement point A. The graph in the lower portion of FIG. 6B shows changes in gas flow velocity at a predetermined position further radially outside the cylinder bore with respect to the measurement point A. In FIGS. 6A and 6B, the velocity of the flow from the intake valve side toward the exhaust valve side is taken to be positive. The same is true for the below-described FIG. 8.

As shown in the upper portion of FIG. 6B, when the tumble flow with the ω tumble shape has occurred, the flow direction of in-cylinder gas at the plug gap position is reversed in the vicinity of the compression top dead center, that is, the flow direction changes from the flow from the intake valve side toward the exhaust valve side to the flow from the exhaust valve side toward the intake valve side. This change in the flow direction of in-cylinder gas is attenuated with the distance from the plug gap position, as follows from the comparison of drawings in FIGS. 6A and 6B. In the case shown in FIGS. 6A and 6B, the reverse of the flow direction does not occur at the measurement point C.

As described hereinabove, when the tumble center axis bends and a drift occurs in the vortex center of the tumble flow in the latter half of the compression stroke, the ω tumble shape is obtained and the flow direction of in-cylinder gas is reversed at the cylinder bore center position (which is also the plug gap position) in the vicinity of the compression top dead center. Therefore, it can be said that the usual tumble shape (also referred to as "first tumble shape") converges to zero as the flow velocity of gas around the sparkplug 32, which is originally directed from the intake valve side toward the exhaust valve side, approaches the compression top dead center, as shown in the below-described FIG. 8, whereas in the ω tumble shape (also referred to as "second tumble shape"), the flow direction of gas around the sparkplug 32 in the latter half of the compression stroke is reversed from the direction from the intake valve side toward the exhaust valve side to the direction from the exhaust valve side toward the intake valve side as the flow velocity close to the plug decreases.

Figure 7A:
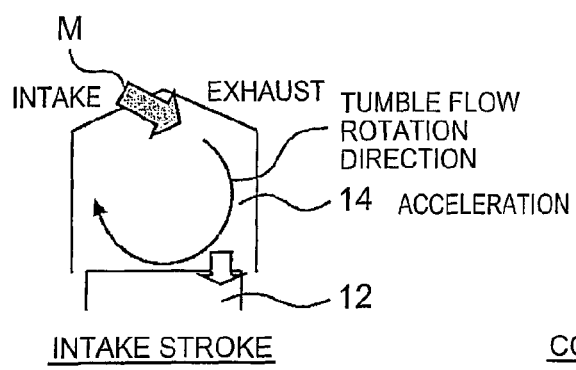
FIGS. 7A and 7B serve to explain a condition suitable for generating the tumble flow with the ω tumble shape.
Figure 7B:
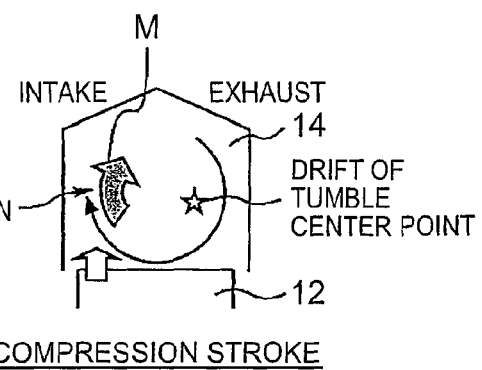

FIGS. 7A and 7B serve to illustrate the conditions suitable for generating the tumble flow with the ω tumble shape. FIG. 7A represents the gas flow inside the cylinder in the middle of the intake stroke. The speed of the piston 12 has a maximum in the middle of the intake stroke, and the valve lift amount of the intake valve 26 is generally set to be the largest at this timing. Therefore, an intake gas mass M with a large flow rate flows into the cylinder in the middle of the intake stroke and is present in the vicinity of the intake valve 26, as shown by an arrow in FIG. 7A.

FIG. 7B shows the gas flow inside the cylinder at a certain timing in the middle of the compression stroke, that is, when the piston 12 makes one stroke from the timing shown in FIG. 7A. The tumble center point shown in FIG. 7B indicates the vortex center of the flow mainly constituted by the intake gas mass M (a state in which a drift has occurred with respect to the volume center of the combustion chamber 14).

In the case shown in FIGS. 7A and 7B, as shown in FIG. 7B, the intake gas mass M shown in FIG. 7A rotates through about 270° inside the cylinder within one stroke of the piston 12 and takes a position on the intake side. In such a case, the drift of the vortex center of the tumble flow with respect to the volume center of the combustion chamber 14 in the latter half of the compression stroke is accelerated, from the very start, by the presence of the intake gas mass M. Moreover, in this case, since the intake gas mass M is positioned on the intake side in the middle period of the compression stroke in which the speed of the piston 12 has a maximum, the flow of the mass M is further accelerated by the rise of the piston 12. As a result, the drift of the vortex center of the tumble flow in the subsequent compression stroke is enhanced.

By contrast with this case, where the intake gas mass is positioned on the exhaust side in the middle period of the compression stroke, the rise of the piston 12 acts to cancel the force of this massive flow. Meanwhile, the non-massive flow positioned on the intake side at this timing is slightly accelerated by the rise of the piston 12. As a result, the vortex center of the tumble flow approaches the volume center of the combustion chamber 14, by contrast with the case illustrated by FIGS. 7A and 7B, and the bending of the tumble center axis is eliminated.

The above-described contents makes it clear that under a condition that the intake gas mass M, which has a large flow rate, is positioned on the intake side at the timing at which the speed of the piston 12 has a maximum in the compression stroke (that is, in the middle period of the compression stroke), the drift of the vortex center of the tumble flow effectively increases and the tumble flow with the ω tumble shape is effectively generated. Therefore, by changing the tumble ratio from a certain value toward the tumble ratio during the rotation of the in-cylinder gas in one stroke, as shown in FIGS. 7A and 7B, it is possible to increase the degree of drift of the vortex center of the tumble flow and intensify the flow with the ω tumble shape.

Figure 8:
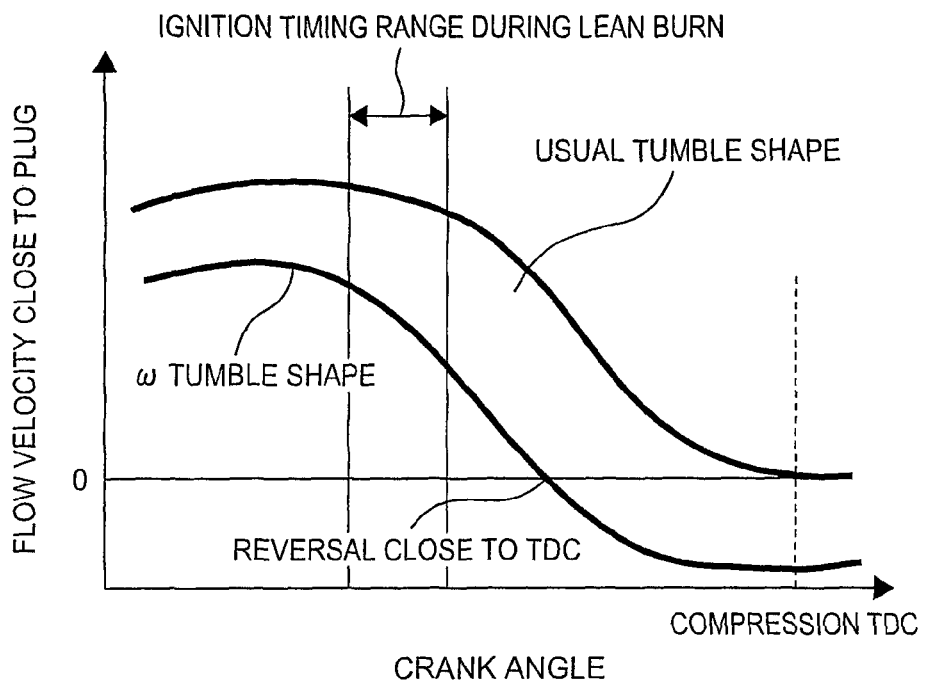
FIG. 8 serves to compare and explain changes in the flow velocity close to the plug in the latter half of the compression stroke for the usual tumble shape and the ω tumble shape.

The specific portion of the control performed in Embodiment 1 is described below. FIG. 8 serves to compare and explain changes in the flow velocity close to the plug in the latter half of the compression stroke for the usual tumble shape and the ω tumble shape. In FIG. 8, a case is presumed in which the reversal timing of the gas flow direction around the sparkplug 32 at the time the tumble flow with the ω tumble shape is generated is after the setting range of the ignition timing during the lean burn operation. The control in the embodiment and the below-described Embodiments 2 to 5 is based on this presumption.

As shown in FIG. 8, when the tumble flow with the ω tumble shape is generated, as the generation of the flow with the ω tumble shape advances in the latter half of the compression stroke, the flow velocity close to the plug decreases greater than in the case in which the tumble flow with the usual tumble shape is generated, and the flow direction of the gas around the sparkplug 32 is soon reversed. Such a decrease in the flow velocity close to the plug becomes more remarkable as the flow with the ω tumble shape becomes stronger, that is, as the drift of the vortex center of the tumble flow is intensified. Therefore, by controlling the tumble flow such that the shape of the tumble flow changes between the usual tumble shape and the ω tumble shape, it is possible to control the flow velocity close to the plug at the time of ignition.

Figure 9:
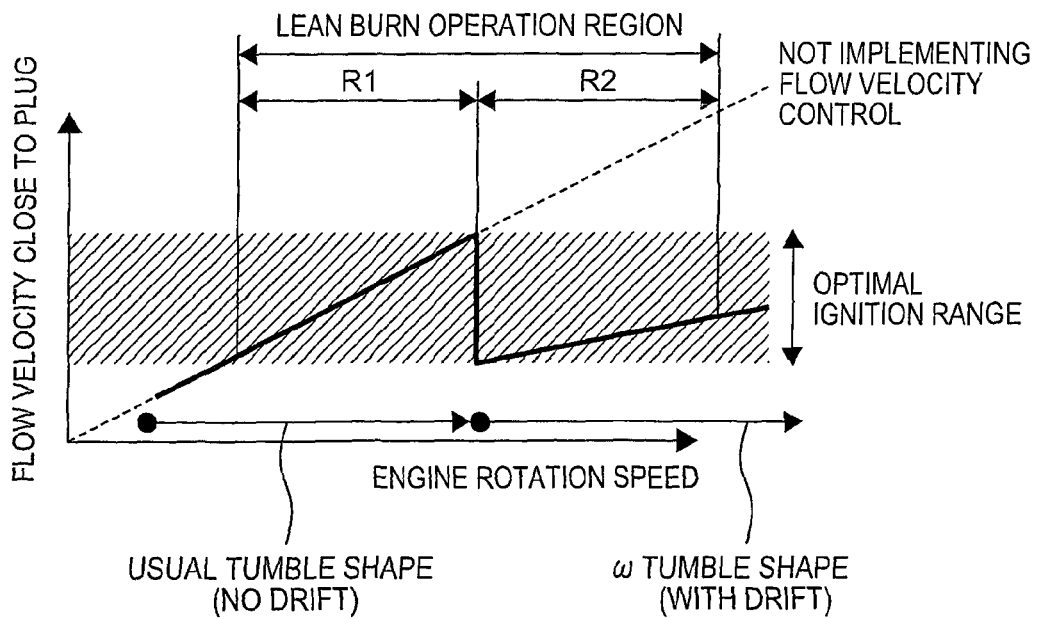
FIG. 9 serves to explain the specific control of the flow velocity close to the plug at the time of ignition in Embodiment 1 of the invention.

FIG. 9 serves to explain the specific control of the flow velocity close to the plug at the time of ignition in Embodiment 1 of the invention. In the embodiment, the shape of the tumble flow is changed between the usual tumble shape and the ω tumble shape according to the engine rotation speed in order to control the flow velocity close to the plug at the time of ignition in a predetermined flow velocity range (ignition optimum range) in a lean burn operation region. More specifically, as shown in FIG. 9, in the first engine rotation speed region R1 on the side of a low engine rotation speed in the lean burn operation region, the tumble flow is controlled such that the generation of the flow with the ω tumble shape is suppressed and the tumble flow with the usual tumble shape is generated. In the second engine rotation speed region R2 on the side of the high engine rotation speed in the lean burn operation region, the tumble flow is controlled such that the tumble flow with the ω tumble shape is generated.

The lean burn operation region, which is the object of tumble flow control in the embodiment, may be set in advance such as to perform the lean burn operation, or the position of this region or the zone occupied thereby in the entire operation region can be changed, as appropriate, during the operation. Further, the lean burn operation region may be the entire operation region in which the lean burn operation is to be performed in the internal combustion engine 10, or may be a partial region thereof in which the ignition ability is to be most strictly ensured by operating at the highest A/F (or A/F range) or by operating using the highest EGR ratio (or EGR ratio range).

The flow velocity range shown in FIG. 9 is the optimal flow velocity range (that is, the optimal ignition range) in which the problem relating to the ignition ability of the air-fuel mixture in the lean burn operation, which has been described hereinabove with reference to FIGS. 2 and 3, can be avoided. Further, this optimal ignition range takes into account the spread of ignition between the cycles. In FIG. 9, in the flow velocity close to the plug—engine rotation speed characteristic, which is shown by a broken line, it is possible that the flow velocity close to the plug at the time of ignition in the lean burn operation region could not be fit into the flow velocity range. By contrast, in the internal combustion engine 10 of the embodiment, the flow velocity close to the plug at the time of ignition can be fit into the flow velocity range in the lean burn operation region by controlling the generation of the tumble flow with the ω tumble shape and the non-generation of the tumble flow with the ω tumble shape according to the changes in the engine rotation speed.

Figure 10A:
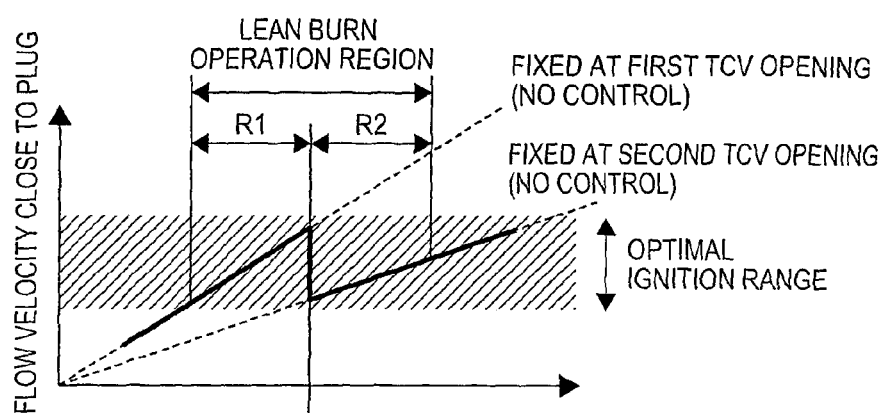
FIGS. 10A, 10B, and 10C serve to explain a method for controlling the flow velocity close to the plug at the time of ignition by controlling the generation and non-generation of the tumble flow with the ω tumble shape by adjusting the tumble ratio with the TCV in Embodiment 1 of the invention.
Figure 10B:
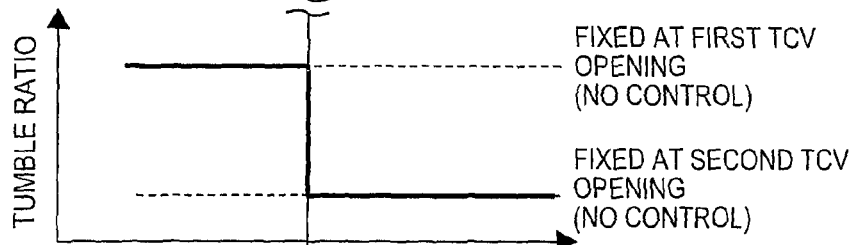
Figure 10C:
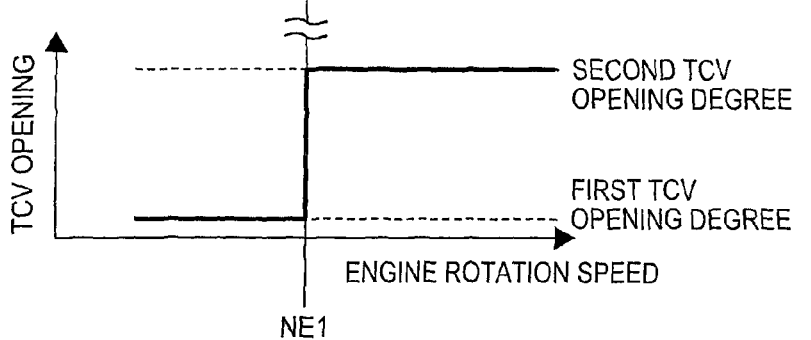

A concrete example of the specific control performed in Embodiment 1 is explained below. FIGS. 10A to 10C serve to explain a method for controlling the flow velocity close to the plug at the time of ignition by controlling the generation and non-generation of the tumble flow with the ω tumble shape by adjusting the tumble ratio with the TCV 24.

With the method shown in FIGS. 10A to 10C, the shape of the tumble flow is controlled between the usual tumble shape and the ω tumble shape by controlling the tumble ratio with the TCV 24. The case in which the TCV opening degree is fixed at the first TCV opening degree shown in FIGS. 10A to 10C, regardless of the engine rotation speed, is shown by a broken line. Where the TCV opening degree is thus fixed at the first TCV opening degree, the flow velocity close to the plug deviates from the optimal ignition range in the region on a high-rotation side in the lean burn operation region due to the increase in the gas flow velocity which follows the increase in the engine rotation speed. Likewise, where the TCV opening degree is fixed at the second TCV opening degree, the flow velocity close to the plug also deviates from the optimal ignition range, in the region on the low-rotation side, as shown by the broken line.

The first TCV opening degree is assumed to be set such as to obtain a tumble ratio that is larger than the tumble ratio within the range suitable for generating the tumble flow with the ω tumble shape (this is a predetermined range centered on a tumble ratio during the rotation of the in-cylinder gas in one stroke, as in the example shown in FIGS. 7A and 7B). By using the first TCV opening degree that has thus been set, it is possible to suppress the generation of the flow with the ω tumble shape and generate the tumble flow with the usual tumble shape. Further, the second TCV opening degree is assumed to be set such as to obtain the tumble ratio within the range suitable for generating the tumble ratio with the ω tumble shape. By using the second TCV opening degree that has thus been set, it is possible to induce a drift of the vortex center of the tumble flow and generate the tumble flow with the ω tumble shape. Furthermore, the second TCV opening degree is assumed to be a TCV opening degree which is set such that the flow velocity close to the plug does not fall below the lower limit of the optimal ignition range at the first engine rotation speed NE1.

In the case shown in FIGS. 10A to 10C, in the region (also referred to as the first engine rotation speed region R1) on the low-rotation side in the lean burn operation region, the first TCV opening degree is used so that the flow velocity close to the plug could be fit into the optimal ignition range by using the tumble flow with the usual tumble shape. Accordingly, in the embodiment, in the engine rotation speed region R1, which is lower than the first engine rotation speed NE1 at which the upper limit of the optimal ignition range is reached while the TCV opening degree is fixed at the first TCV opening degree, the TCV opening degree is controlled to the first TCV opening degree.

Meanwhile, in the high engine rotation speed region (also referred to as the second engine rotation speed region R2), which is equal to or higher than the first engine rotation speed NE1, the TCV opening degree is controlled to the second TCV opening degree. As a result, the flow velocity close to the plug can be reduced in the vicinity of the first engine rotation speed NE1, at which the tumble flow shape is changed, as shown in FIG. 10A, by generating the tumble flow with the ω tumble shape. By so changing the tumble flow shape according to the engine rotation speed, it is possible to maintain the flow velocity close to the plug at the time of ignition in the lean burn operation region within the optimal ignition range.

Further, with the method shown in FIGS. 10A to 10C, the TCV opening degree is fixed at the second TCV opening degree in the region R2 on the high-rotation side with respect to the first engine rotation speed NE1, but the TCV opening degree may be instead adjusted such as to obtain a tumble ratio with a higher degree of drift of the vortex center of the tumble flow at a higher engine rotation speed in the region on the high-rotation side. As a result, the flow with the ω tumble shape is further intensified following the increase in the engine rotation speed, and therefore a change in the flow velocity close to the plug caused by a change in the engine rotation speed in the region on the high-rotation side can be moderated, as shown in FIG. 9.

Figure 11:
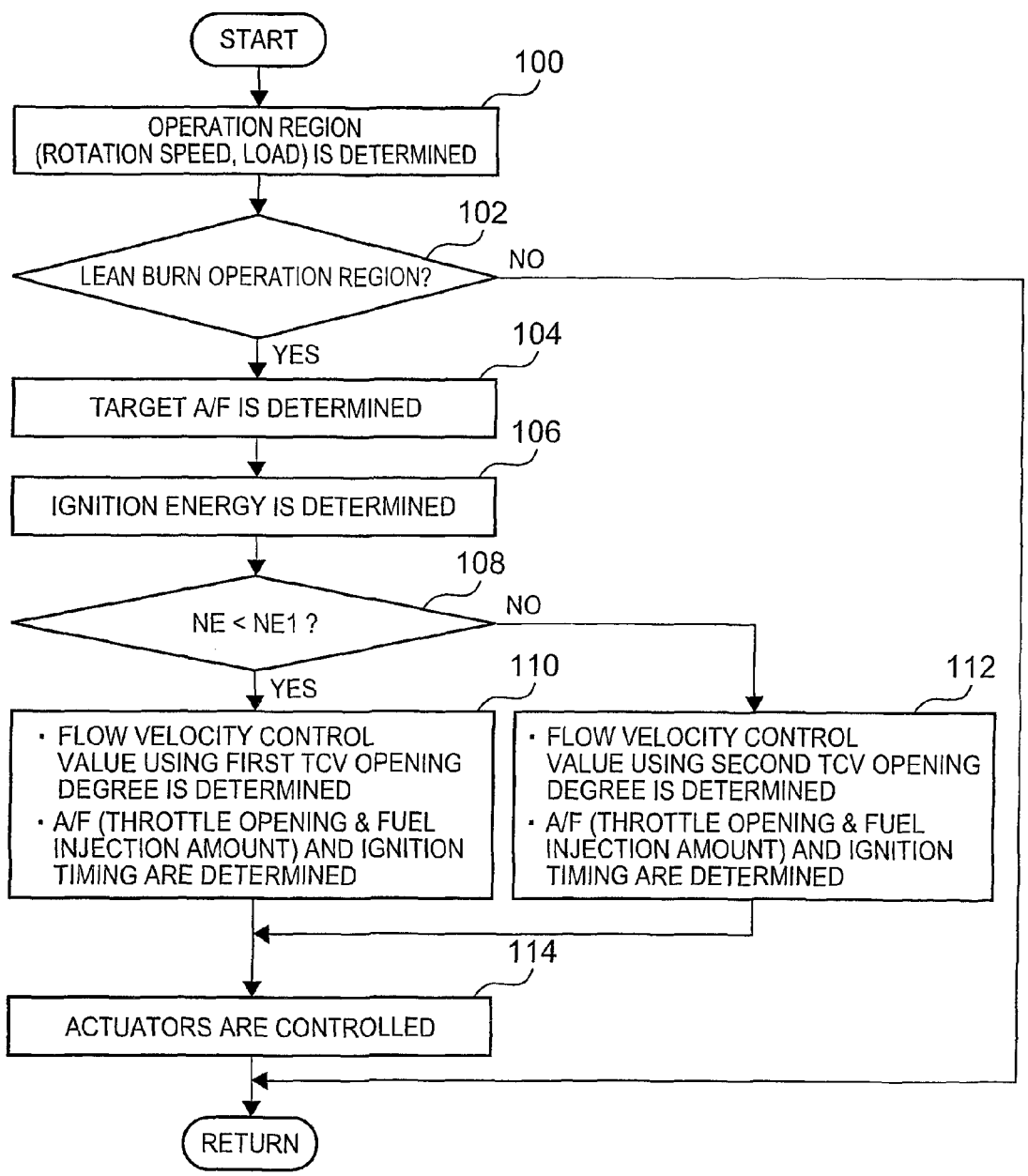
FIG. 11 is a flowchart of the routine executed in Embodiment 1.

FIG. 11 is a flowchart showing a control routine executed by the ECU 40 in order to realize the specific control of Embodiment 1 of the invention. The routine is executed repeatedly for each cycle of the internal combustion engine 10 with respect to each cylinder.

In the routine shown in FIG. 11, the ECU 40 initially uses the output of the air flow meter 20 and the crank angle sensor 42 and determines (specifies) the present operation region of the internal combustion engine 10 (this operation region is determined by the engine rotation speed and engine load) (step 100). Then, the ECU 40 determines whether the present operation region is the lean burn operation region with a low fuel concentration in the air-fuel mixture (step 102).

Where it is determined in step 102 that the present operation region is the lean burn operation region, the ECU 40 determines a target A/F (step 104). With the object of suppressing the NOx exhaust amount, the ECU 40 stores a map (not shown in the figure) in which the target A/F is determined according to the operation region, and determines the target A/F in step 104 by referring to the map.

Then, the ECU. 40 determines the ignition energy to be supplied to the sparkplug 32 according to the determined target A/F (step 106). The ignition energy can be adjusted, for example, by providing a plurality of ignition coils for the sparkplug 32 and changing, as necessary, the number of the ignition coils used for discharge.

Then, the ECU 40 determines whether or not the present engine rotation speed NE is lower than the first engine rotation speed NE1 (step 108). As mentioned hereinabove, the first engine rotation speed NE1 is a threshold for changing the tumble flow shape according to the engine rotation speed in the lean burn operation region.

Where a positive determination is made in step 108 (NE<NE1), the ECU 40 determines a flow velocity control value (target TCV opening degree) by using the first TCV opening degree, and also determines, according to predetermined maps or the like, the target values for the throttle opening degree, fuel injection amount, and ignition timing for realizing the required torque under the target A/F (step 110). Meanwhile, where a negative determination is made in step 108 (NE≥NE1), the ECU 40 determines the flow velocity control value (target TCV opening degree) by using the second TCV opening degree, and also determines, according to predetermined maps or the like, the target values for the throttle opening degree, fuel injection amount, and ignition timing for realizing the required torque under the target A/F (step 112). Then, the ECU 40 controls the actuators according to the determined target values (step 114). The actuators, as referred to herein, are the throttle valve 22, the TCV 24, the fuel injection valve 30, and the sparkplug 32.

According to the above-described routine shown in FIG. 11, the tumble flow shape is changed between the usual tumble shape and the ω tumble shape according to the engine rotation speed by using the TCV 24. With such control of the TCV 24, the flow velocity close to the plug at the time of ignition in the lean burn operation region can be maintained within the optimal ignition range, regardless of the value of the engine rotation speed. Therefore, the ignition ability of the air-fuel mixture during lean burn operation can be improved.

With the tumble flow control method of the embodiment, the adjustment amount of tumble ratio is reduced by comparison with the method by which the flow velocity close to the plug is controlled by adjusting the tumble ratio without changing the tumble flow shape. As a result, the ignition ability can be improved by controlling the flow velocity close to the plug, without weakening much the turbulence of the in-cylinder gas, the turbulence being important for combustion.

In the above-described Embodiment 1, the TCV opening degree is controlled between the first TCV opening degree at which a tumble ratio is obtained which is larger than the tumble ratio within the range suitable for generating the tumble flow with the ω tumble shape and the second TCV opening degree at which a tumble ratio is obtained within the range suitable for generating the tumble flow with the ω tumble shape in order to control the generation and non-generation of the tumble flow with the ω tumble shape according to the engine rotation speed in the lean burn operation region. However, the TCV opening degree for non-generating the tumble flow with the ω tumble shape may be a predetermined TCV opening degree at which a tumble ratio is obtained which is less than the tumble ratio within the range suitable for generating the tumble flow with the ω tumble shape, instead of the first TCV opening degree.

In the control of the routine shown in FIG. 11 of the above-descried Embodiment 1, the flow velocity close to the plug at the time of ignition is controlled to the optimal ignition range by controlling the TCV opening degree such as to obtain a target TCV opening degree corresponding to the target value of the flow velocity close to the plug within the target flow velocity range (optimal ignition range) in the lean burn operation region. The following feedback control may be performed in addition to such a control. Thus, the flow velocity close to the plug can be measured, for example, on the basis of a discharge voltage by providing a device for measuring the discharge voltage of the ignition coil applied to the sparkplug 32. The flow velocity close to the plug may be also estimate, for example, on the basis of combustion fluctuations estimated using the crank angle sensor 42, or the like. Further, where the measured value deviates from the target value of the flow velocity close to the plug during the operation of the internal combustion engine 10, feedback control may be performed for adjusting the TCV opening degree such as to fit the measured value of the flow velocity close to the plug into the optimal ignition range. Further, where the abovementioned deviation occurs, feedback control by which the A/F inside the cylinder or the ignition energy is adjusted may performed instead of the feedback control of the TCV opening degree. In the case of the A/F inside the cylinder, it is preferred that the A/F be controlled to the rich side in order to improve the combustion, and when the ignition energy is controlled, it is preferred that the ignition energy be increased for the same reason. The aforementioned types of feedback control may be combined with any of the below-described embodiments.

In the above-described first aspect of the invention, the "electronic control unit" according to the one aspect of the invention is realized by executing the processing of steps 108 to 114 with the ECU 40.

Embodiment 2 of the invention will be explained below with reference to FIGS. 12A to 12C and 13. The system of the embodiment can be realized by using the hardware configuration shown in FIG. 1 and executing the below-described routine shown in FIG. 13, instead of the routine shown in FIG. 11, in the ECU 40.

Figure 12A:
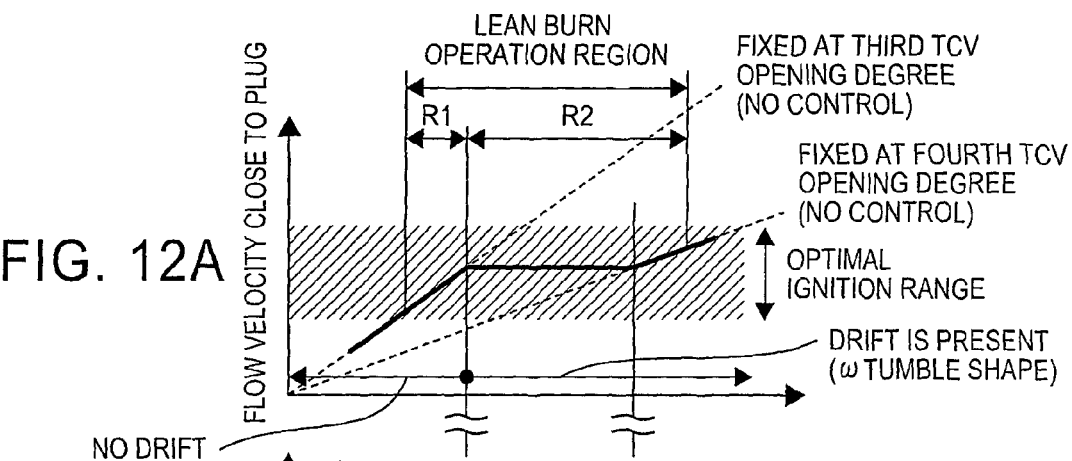
FIGS. 12A, 12B, and 12C serve to explain a method for controlling the flow velocity close to the plug at the time of ignition by controlling the generation and non-generation of the tumble flow with the ω tumble shape by changing the tumble ratio with the TCV in Embodiment 2 of the invention.
Figure 12B:
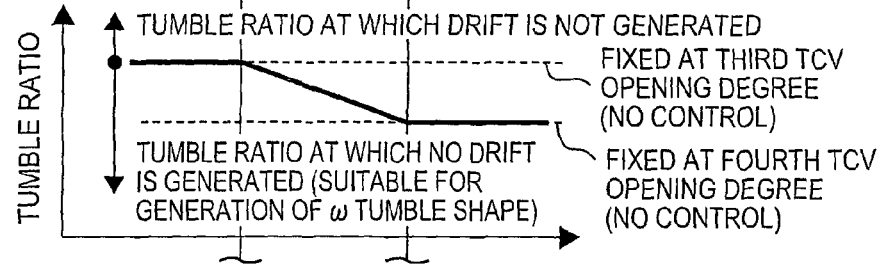
Figure 12C:
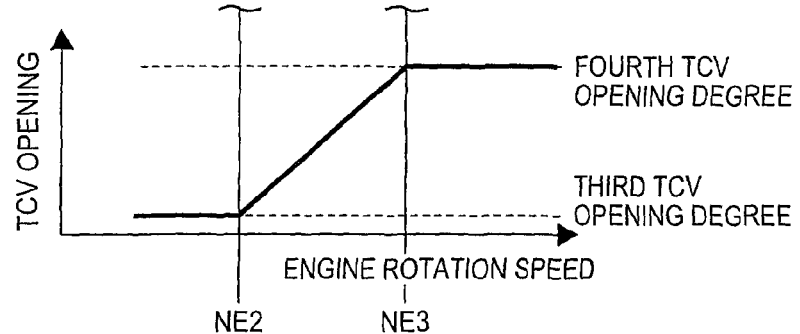

FIGS. 12A to 12C serve to explain a method for controlling the flow velocity close to the plug at the time of ignition by controlling the generation and non-generation of the tumble flow with the ω tumble shape by changing the tumble ratio with the TCV 24 in Embodiment 2 of the invention. With the method for controlling the tumble flow in the embodiment, an engine rotation speed region in which the flow velocity close to the plug is substantially constant with respect to changes in the engine rotation speed is created such as to fit the flow velocity close to the plug into the optimal ignition range in the lean burn combustion region by controlling the generation and non-generation of the tumble flow with the ω tumble shape by using the TCV 24.

More specifically, in a region on the low-rotation side (also referred to as the first engine rotation speed region R1) with respect to the second engine rotation speed NE2 in the lean burn operation region, the TCV opening degree is controlled to a third TCV opening degree for generating the tumble flow with the usual tumble shape. The third TCV opening degree is an opening degree at which a tumble ratio is obtained close to a boundary (the boundary, as referred to herein, is shown at the upper limit in the example shown in FIGS. 12A to 12C) of the tumble ratio range suitable for generating the tumble flow with the ω tumble shape.

As shown in FIG. 12C, in the engine rotation speed region (included in the second engine rotation speed region R2) from the second engine rotation speed NE2 to the third engine rotation speed NE3 in the lean burn operation region, the TCV opening degree is gradually increased from the third TCV opening degree to the fourth TCV opening degree following the increase in the engine rotation speed. The tumble ratio, as shown in FIG. 12B, gradually decreases, as the engine rotation speed increases, from a value close to the abovementioned boundary so that the rotation angle of the in-cylinder gas in one stroke approaches the optimal tumble ratio (the tumble ratio explained with reference to FIGS. 7A and 7B) in the tumble ratio range. As a result, in the engine rotation speed region (NE2 to NE3), the tumble flow with the ω tumble shape is generated, and the generated flow with the ω tumble shape is strengthened by the increase in the drift degree of the vortex center of the tumble flow that follows the increase in the engine rotation speed.

Where the tumble ratio is constant, the flow velocity close to the plug increases monotonously as the engine rotation speed rises. Further, as the flow with the ω tumble shape is strengthened, the flow velocity close to the plug at the time of ignition can be reduced. Therefore, in the engine rotation speed region (NE2 to NE3), the TCV opening degree is increased such as to cancel the action increasing the flow velocity close to the plug as the engine rotation speed rises by the action decreasing the flow velocity close to the plug which results from the strengthening of the flow with the ω tumble shape. As a consequence, the property of the flow velocity close to the plug being substantially constant with respect to changes in the engine rotation speed can be obtained. In the case shown in FIGS. 12A to 12C, in a region (this region is also referred to as the second engine rotation speed region R2) on the high-rotation side with respect to the third engine rotation speed NE3 in the lean burn operation region, since the TCV opening degree is fixed at the fourth TCV opening degree, the flow velocity close to the plug increases monotonously as the engine rotation speed rises.

FIG. 13 is a flowchart of the control routine executed by the ECU 40 for realizing the specific control in Embodiment 2 of the invention. In FIG. 13, steps same as those shown in FIG. 11 relating to Embodiment 1 are assigned with the same reference numerals and the explanation thereof is omitted or simplified.

In the routine shown in FIG. 13, the ECU 40 determines the ignition energy in step 106 and then determines whether or not the present engine rotation speed NE is lower than the second engine rotation speed NE2 (step 200). The second engine rotation speed NE2 is a threshold for changing the tumble flow shape according to the engine rotation speed in the lean burn operation region.

Where a positive determination is made in step 200 (NE<NE2), the ECU 40 determines a flow velocity control value (target TCV opening degree) by using the third TCV opening degree and also determines, according to a predetermined map or the like, the target values of the throttle opening degree, fuel injection amount, and ignition timing for realizing the required torque at the target A/F (step 202). Meanwhile, where a negative determination is made in step 200, the ECU 40 then determines whether or not the present engine rotation speed NE is equal to or higher than the second engine rotation speed NE2 and lower than the third engine rotation speed NE3 (step 204).

Where a positive determination is made in step 204 (NE2≤NE<NE3), the ECU 40 then determines the flow velocity control value (in the embodiment, the target TCV opening degree) such that the flow velocity close to the plug is substantially constant with respect to changes in the engine rotation speed, and also determines, according to a predetermined map or the like, the target values of the throttle opening degree, fuel injection amount, and ignition timing for realizing the required torque at the target A/F (step 206). More specifically, the ECU 40 stores a map (not shown in the figure) in which the TCV target opening degree such that the action increasing the flow velocity close to the plug as the engine rotation speed rises can be canceled by the action decreasing the flow velocity close to the plug, which results from the strengthening of the flow with the ω tumble shape, has been set in advance by tests, or the like, in relation to the engine rotation speed in order to determine the target TCV opening degree that is to be used in the lean burn operation region. In this step 206, the ECU 40 determines the target TCV opening degree (flow velocity control value) corresponding to the present engine rotation speed by referring to the map.

Meanwhile, where a negative determination is made in step 204 (NE3≤NE), the ECU 40 determines the flow velocity control value (target TCV opening degree) by using the fourth TCV opening degree and determines, according to a predetermined map, or the like, the target values of the throttle opening degree, fuel injection amount, and ignition timing for realizing the required torque at the target A/F (step 208).

With the above-described routine shown in FIG. 13, the flow velocity close to the plug at the time of ignition in the engine rotation speed region in which the lean burn operation is performed can be controlled to be substantially constant with respect to changes in the engine rotation speed by changing the shape of the tumble flow between the usual tumble shape and the ω tumble shape according to the engine rotation speed by using the TCV 24. As a result, the flow velocity close to the plug at the time of ignition can be advantageously fit into the optimal ignition range.

The flow velocity close to the plug within the optimal ignition range has an optimal value at which the ignition lag is at the minimum. With the control method of the embodiment, the flow velocity close to the plug can be easier controlled to obtain such an optimal value than with the control method of Embodiment 1. Therefore, the lean limit can be expanded while improving the ignition ability of the air-fuel mixture during lean burn operation.

In the above-described Embodiment 2, the TCV opening degree is controlled between the third TCV opening degree at which the tumble ratio close to the boundary (upper limit) of the tumble ratio range suitable for generating the tumble flow with the ω can be obtained and the fourth TCV opening degree at which the tumble ratio within the range suitable for generating the tumble flow with the ω can be obtained in order to obtain the property of the flow velocity close to the plug being substantially constant with respect to changes in the engine rotation speed in the engine rotation speed region in which lean burn operation is performed. However, the TCV opening degree that is used for such control may be a predetermined TCV opening degree at which the tumble ratio close to the boundary (lower limit) of the tumble ratio range suitable for generating the tumble flow with the ω tumble shape can be obtained, instead of the third TCV opening degree. More specifically, in the engine rotation speed region in the lean burn operation region, the TCV opening degree may be gradually decreased from the predetermined TCV opening degree toward the fourth TCV opening degree as the engine rotation speed increases. As a consequence, the tumble ratio gradually increases, as the engine rotation speed increases, from a value close to the abovementioned boundary so that the rotation angle of the in-cylinder gas in one stroke approaches the optimal tumble ratio within the tumble ratio range. As a result, with such an alternative method, in the engine rotation speed region, the tumble flow with the ω tumble shape is also generated, and the generated flow with the ω tumble shape is strengthened by the increase in the drift degree of the vortex center of the tumble flow that follows the increase in the engine rotation speed.

In the above-described Embodiment 2, the "electronic control unit" according to the first to fourth aspects of the invention is realized by executing the processing of steps 200 to 208 and 114 with the ECU 40.

Figure 14:
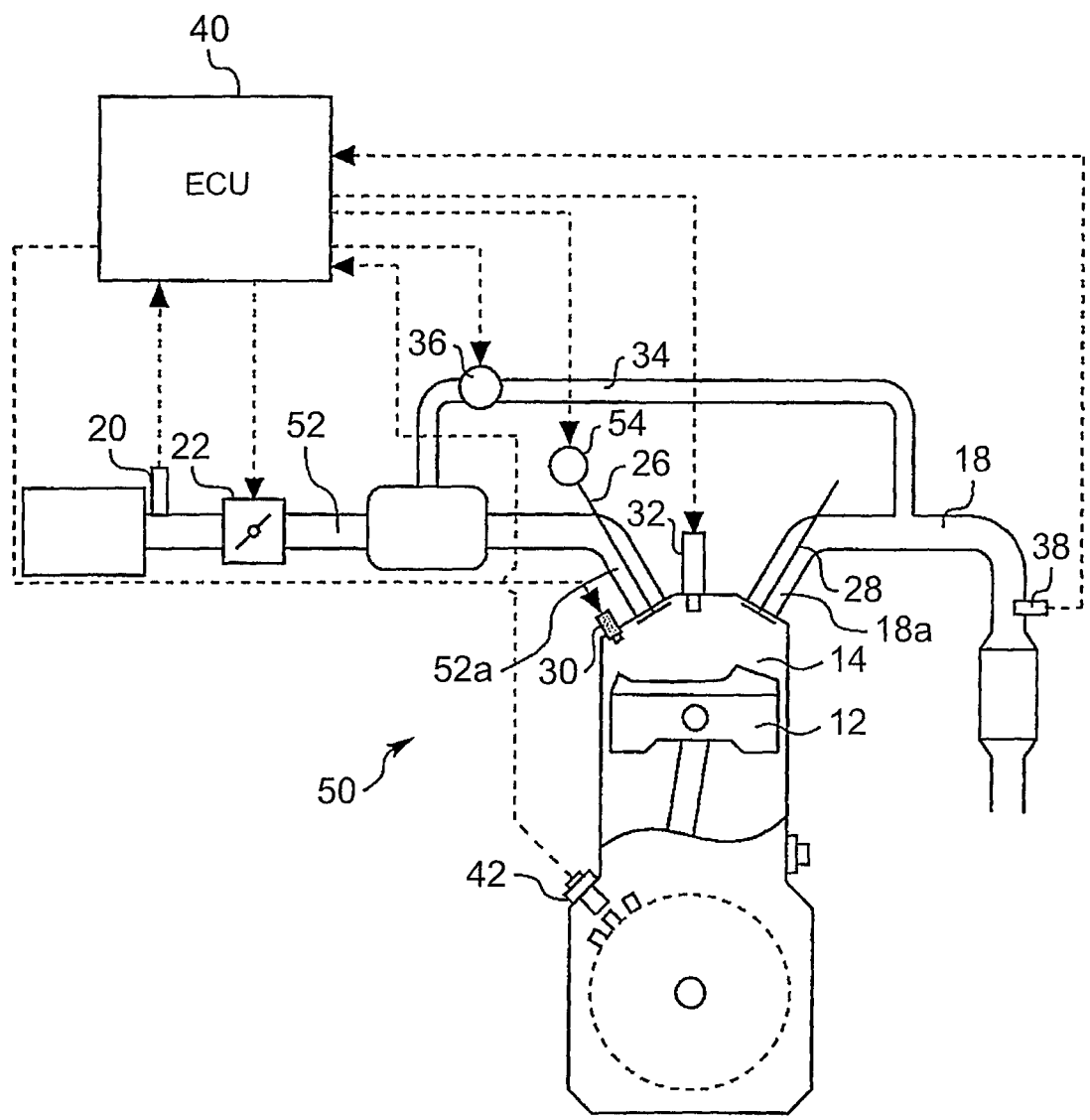
FIG. 14 is a schematic diagram for explaining the system configuration of an internal combustion engine of Embodiment 3 of the invention.

Embodiment 3 of the invention will be explained below with reference to FIGS. 14 and 15. Initially, the system configuration will be explained. FIG. 14 is a schematic configuration for explaining the system configuration of an internal combustion engine 50 of Embodiment 3 of the invention. In FIG. 14, constituent elements same as those shown in FIG. 1 are assigned with the same reference numerals and the explanation thereof is omitted or simplified.

The internal combustion engine 50 of the embodiment is configured in the same manner as the above-described internal combustion engine 10, except that the tumble flow inside a cylinder can be generated by the shape of an intake port 52a of an intake passage 52, without providing the TCV 24, and that an intake variable valve device 54 is provided. The intake variable valve device 54 has two cams of different profiles for driving the intake valve 26 and can change the valve lift characteristic of the intake valve 26 in two stages by switching the cams. A valve device capable of switching in two stages the valve lift characteristic is by itself available, and the explanation of the specific configuration thereof is herein omitted.

Figure 15:
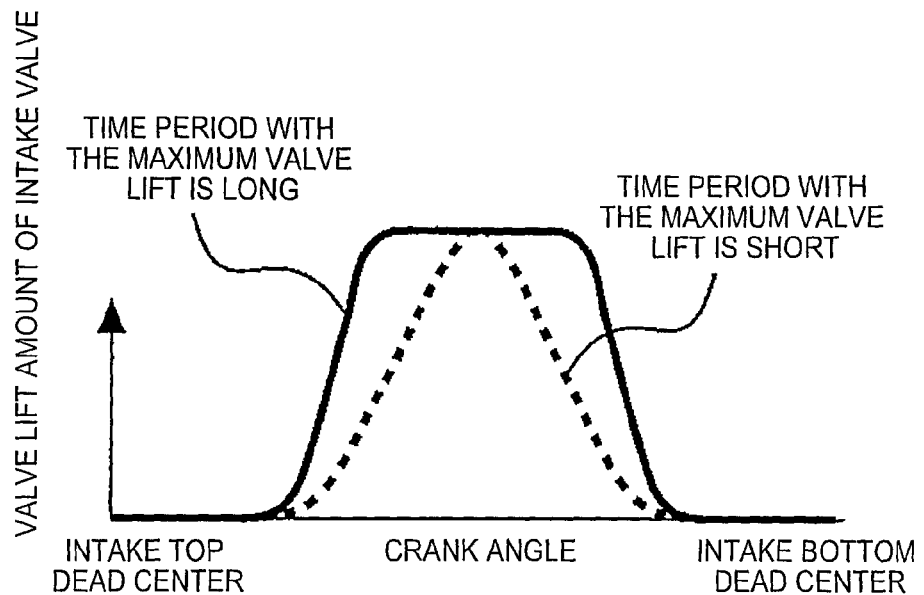
FIG. 15 serves to explain the valve lift characteristic of the intake valve that is changed by the intake variable valve device shown in FIG. 14.

FIG. 15 serves to explain the valve lift characteristic of the intake valve 26 that is changed by the intake variable valve device 54 shown in FIG. 14. As shown in FIG. 15, the intake variable valve device 54 switches a valve lift characteristic between a valve lift characteristic of a typical shape that is shown by a broken line and a valve lift characteristic (shown by a solid line) in which the period of time in which the valve lift amount has a maximum is longer than that of the valve lift characteristic shown by the broken line.

Figures 16A, 16B:
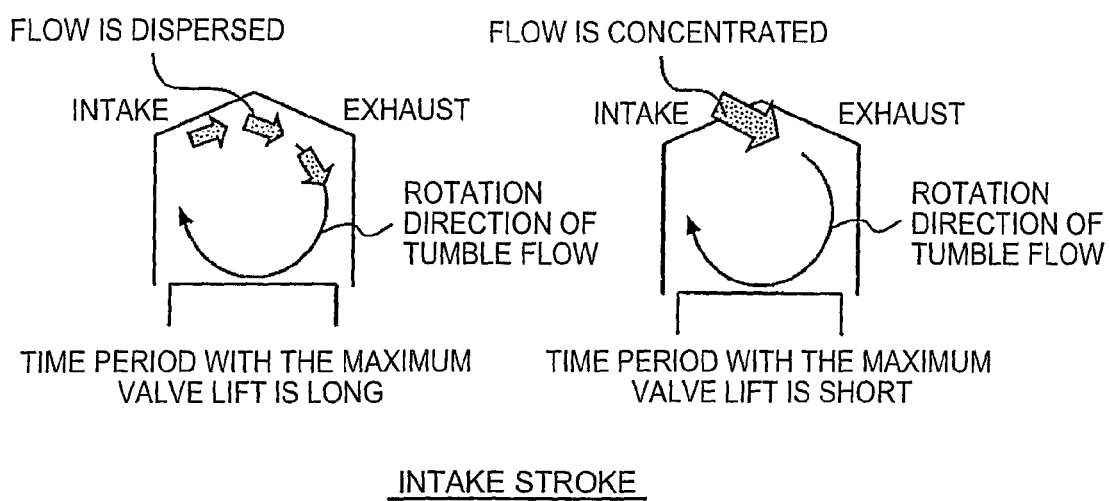
FIGS. 16A and 16B serve to explain a change of gas flow inside the cylinder that follows switching of the valve lift characteristic shown in FIG. 15.

The specific portion of the control performed in Embodiment 3 is explained below. FIGS. 16A and 16B serve to explain a change in gas flow inside a cylinder that follows the switching of the valve lift characteristic shown in FIG. 15. FIGS. 16A and 16B represent a period close to a timing (middle period of intake stroke) at which the speed of the piston 12 in the intake stroke has a maximum, and the intake gas flows into the cylinder in a state with a large flow rate because of a large valve lift amount of the intake valve 26.

When a valve lift characteristic with a long valve lift maximum period of time is selected, as shown in FIG. 16A, the intake gas flows into the cylinder in a dispersed state, without forming a large mass, close to the timing at which the intake gas flows in a state with a large flow rate. Meanwhile, when a valve lift characteristic with a short valve lift maximum period of time is selected, as shown in FIG. 16B, the intake gas flows into the cylinder as a large concentrated mass close to the abovementioned timing. Thus, the intake variable valve device 54 that can change the period of time in which the valve lift has a maximum is an actuator affecting the gas flow inside the cylinder.

By extending the valve lift maximum period of time and dispersing the intake gas mass, it is possible to suppress the drift of the vortex center of the tumble flow with respect to the volume center of the combustion chamber 14 in the latter half of the compression stroke. As a result, the generation of the flow with the ω tumble shape is suppressed and the tumble flow with the usual tumble shape is generated, thereby making it possible to increase the flow velocity close to the plug at the time of ignition. Meanwhile, by shortening the valve lift maximum period of time and concentrating the intake gas mass, it is possible to generate the shift of the vortex center of the tumble flow. As a result, the tumble flow with the ω tumble shape is generated and, therefore, the flow velocity close to the plug is reduced by comparison with that when the tumble flow with the usual tumble shape is generated. In order to generate effectively the tumble flow with the ω tumble shape when the valve lift maximum period of time is shortened by control, it is preferred that the intake port 52a provided in the internal combustion engine 50 be configured such as to obtain a tumble ratio (tumble ratio explained with reference to FIGS. 7A and 7B) suitable for generating the tumble flow with the ω tumble shape.

Accordingly, in the embodiment, the tumble flow shape is switched between the usual tumble shape and the ω tumble shape by changing the valve lift maximum period of time of the intake valve 26 according to the engine rotation speed by using the intake variable valve device 54 in the lean burn operation region. More specifically, in the region on the low-rotation side within the lean burn operation region (also referred to as the first engine rotation speed region R1), the valve lift characteristic with a long valve lift maximum period of time is selected, and in the region on the high-rotation side (also referred to as the second engine rotation speed region R2), the valve lift characteristic with a short valve lift maximum period of time is selected.

Figures 17A, 17B:
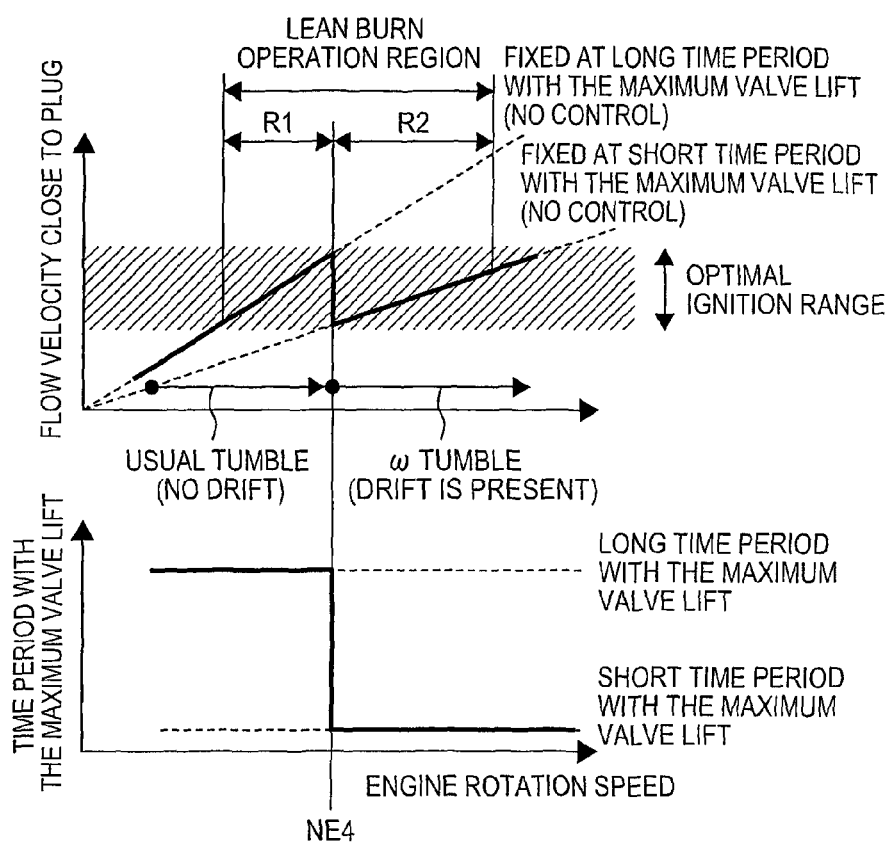
FIGS. 17A and 17B serve to explain a method for controlling the flow velocity close to the plug at the time of ignition by controlling the generation and non-generation of the tumble flow with the ω flow shape by switching the period of time with a maximum valve lift with the intake variable valve device in Embodiment 3.

A concrete example of the specific control performed in Embodiment 3 is explained below. FIGS. 17A and 17B serve to explain a method for controlling the flow velocity close to the plug at the time of ignition by controlling the generation and non-generation of the tumble flow with the ω flow shape by switching the valve lift maximum period of time with the intake variable valve device 54.

As shown in FIGS. 17A and 17B, when the valve lift characteristic with a long valve lift maximum period of time is used continuously, irrespectively of the engine rotation speed, the flow velocity close to the plug deviates from the optimal ignition range within the region on the high-rotation side in the lean burn operation region due to the increase in the gas flow velocity that follows the increase in the engine rotation speed. Likewise, when the valve lift characteristic with a short valve lift maximum period of time is used continuously, the flow velocity close to the plug deviates from the optimal ignition range within the region on the low-rotation side.

In the case shown in FIGS. 17A and 17B, in the region R1 on the low-rotation side in the lean burn operation region, the tumble flow with the usual tumble shape can be used and the flow velocity close to the plug can be fit into the optimal ignition range by using the valve lift characteristic with a long valve lift maximum period of time. Accordingly, in the embodiment, while the valve lift characteristic with a long valve lift maximum period of time is used continuously, in the engine rotation speed region R1 which is lower than the fourth engine rotation speed NE4 that reaches the upper limit of the optimal ignition range, the valve lift characteristic with a long valve lift maximum period of time is selected.

Meanwhile, in the engine rotation speed region R2 which is equal to or higher than the fourth engine rotation speed NE4, the valve lift characteristic with a short period of time with a maximum valve lift is selected. As a result, the flow velocity close to the plug can be reduced in the vicinity of the fourth engine rotation speed NE4 at which the tumble flow shape is changed, as shown in FIG. 17A, by generating the tumble flow with the ω tumble shape. By so changing the tumble flow shape according to the engine rotation speed, it is possible to maintain the flow velocity close to the plug at the time of ignition in the lean burn operation region within the optimal ignition range. During switching of the valve lift characteristic, the opening degree of the throttle valve 22 is adjusted to cancel changes in the intake air amount.

Further, with the method shown in FIGS. 17A and 17B, in the region R2 on the high-rotation side with respect to the fourth engine rotation speed NE4, a single valve lift characteristic with a short period of time with a maximum valve lift is used. However, instead of the above-described method, it is also possible to change the period of time with a maximum valve lift in the lean burn operation region continuously according to the engine rotation speed by using a variable valve device of an electromagnetic drive system or a system in which the cam is driven with an electric motor in order to drive the intake valve 26. Thus, with such a method, the flow velocity close to the plug may be better controlled to obtain the desired value of the flow velocity close to the plug during lean burn operation.

Figure 18:
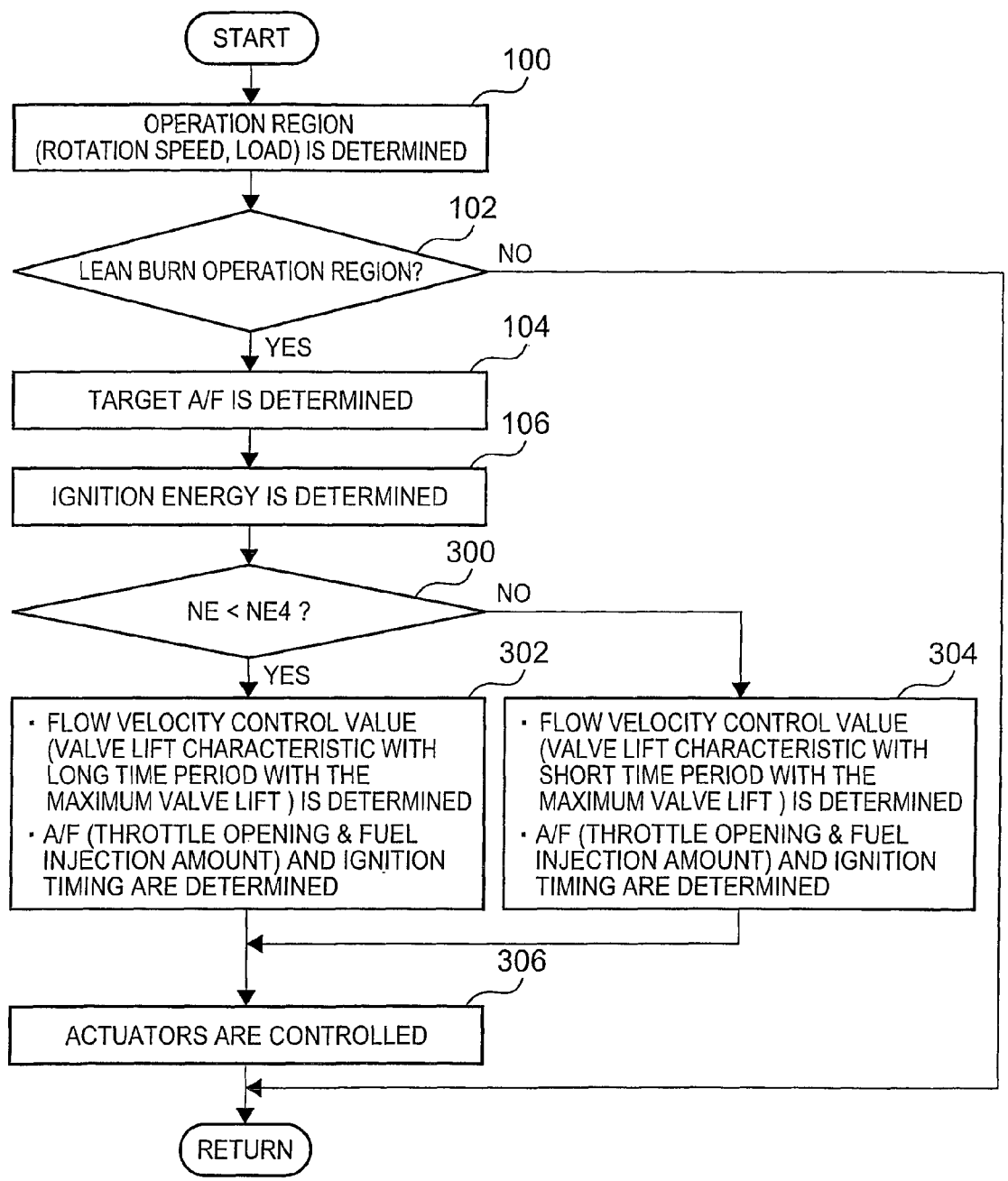
FIG. 18 is a flowchart of the routine executed in Embodiment 3.

FIG. 18 is a flowchart of a control routine executed by the ECU 40 for realizing the specific control of Embodiment 3 of the invention. In FIG. 18, steps same as those in FIG. 11 relating to Embodiment 1 are assigned with the same reference numerals and the explanation thereof is herein omitted or simplified.

In the routine shown in FIG. 18, the ECU 40 determines the ignition energy in step 106 and then determines whether or not the present engine rotation speed NE is lower than the fourth engine rotation speed NE4 (step 300). As mentioned hereinabove, the fourth engine rotation speed NE4 is a threshold for changing the tumble flow shape according to the engine rotation speed in the lean burn operation region.

Where a positive determination is made in step 300 (NE<NE4), the ECU 40 selects the cam providing for the valve lift characteristic with a long period of time with a maximum valve lift as a flow velocity control value (target valve lift characteristic), and determines, according a predetermined map or the like, the target values of throttle opening degree, fuel injection amount, and ignition timing for realizing the required torque at the target A/F (step 302). Meanwhile, where a negative determination is made in step 300 (NE≥NE4), the ECU 40 selects the cam providing for the valve lift characteristic with a short period of time with a maximum valve lift as a flow velocity control value (target valve lift characteristic), and determines, according a predetermined map or the like, the target values of throttle opening degree, fuel injection amount, and ignition timing for realizing the required torque at the target A/F (step 304). Then, the ECU 40 controls the actuators (throttle valve 22, fuel injection valve 30, sparkplug 32, and intake variable valve device 54) according to the respective determined target values (step 306).

With the above-described routine shown in FIG. 18, the flow velocity close to the plug at the time of ignition in the lean burn operation region can be maintained within the optimal ignition range, regardless of the engine rotation speed value, by changing the tumble flow shape between the usual tumble shape and the ω tumble shape according to the engine rotation speed by using the intake variable valve device 54 capable of switching the period of time with a maximum valve lift. Further, with the method for controlling the tumble flow of the embodiment, the presence/absence of the drift of the vortex center of tumble flow (tumble shape) can be controlled without relying on the control of the tumble ratio itself (that is, without weakening the turbulence of in-cylinder gas which is important for combustion). Therefore, the ignition ability of the air-fuel mixture during lean burn operation can be improved while ensuring the expansion of a lean limit (improving fuel efficiency).

In the above-described Embodiment 3, the "electronic control unit" according to the first to fourth aspects of the invention is realized by executing the processing of steps 300 to 306 with the ECU 40.

Figure 19:
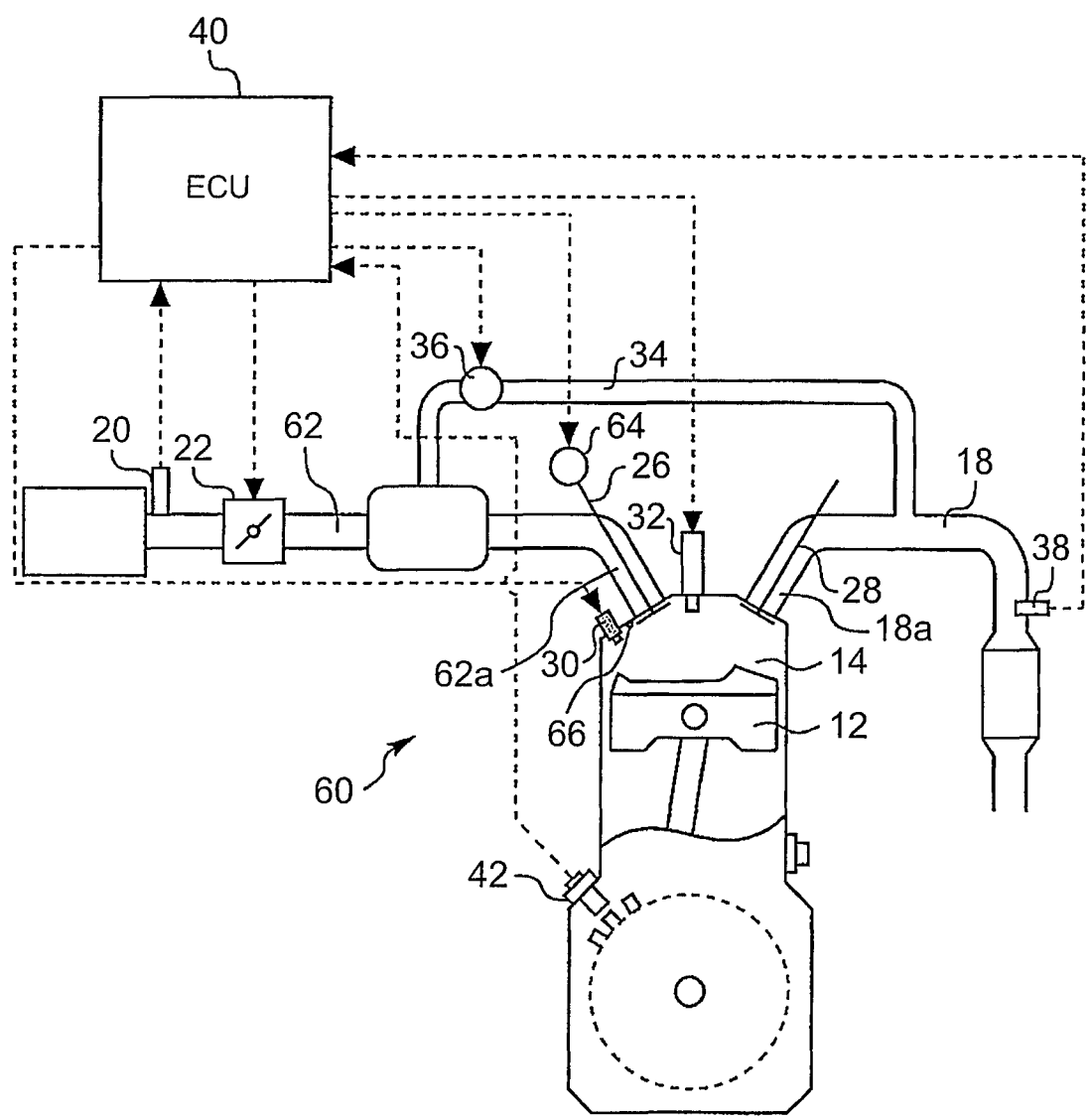
FIG. 19 is a schematic diagram for explaining the system configuration of an internal combustion engine of Embodiment 4 of the invention.

Embodiment 4 of the invention will be explained below with reference to FIGS. 19 to 23. Initially, the system configuration is explained. FIG. 19 is a schematic diagram for explaining the system configuration of an internal combustion engine 60 of Embodiment 4 of the invention. In FIG. 19, constituent elements same as those shown in FIG. 1 are assigned with the same reference numerals and the explanation thereof is herein omitted or simplified.

The internal combustion engine 60 of the embodiment is configured in the same manner as the above-described internal combustion engine 10, except that the tumble flow inside a cylinder can be generated by the shape of an intake port 62a of an intake passage 62, without providing the TCV 24, and that an intake variable valve device 64 and a valve mask 66 are provided. The intake variable valve device 64 can change continuously the lift amount of the intake valve 26. A variable valve device having such a function is by itself available, and the explanation of the specific configuration thereof is herein omitted.

Figure 20:
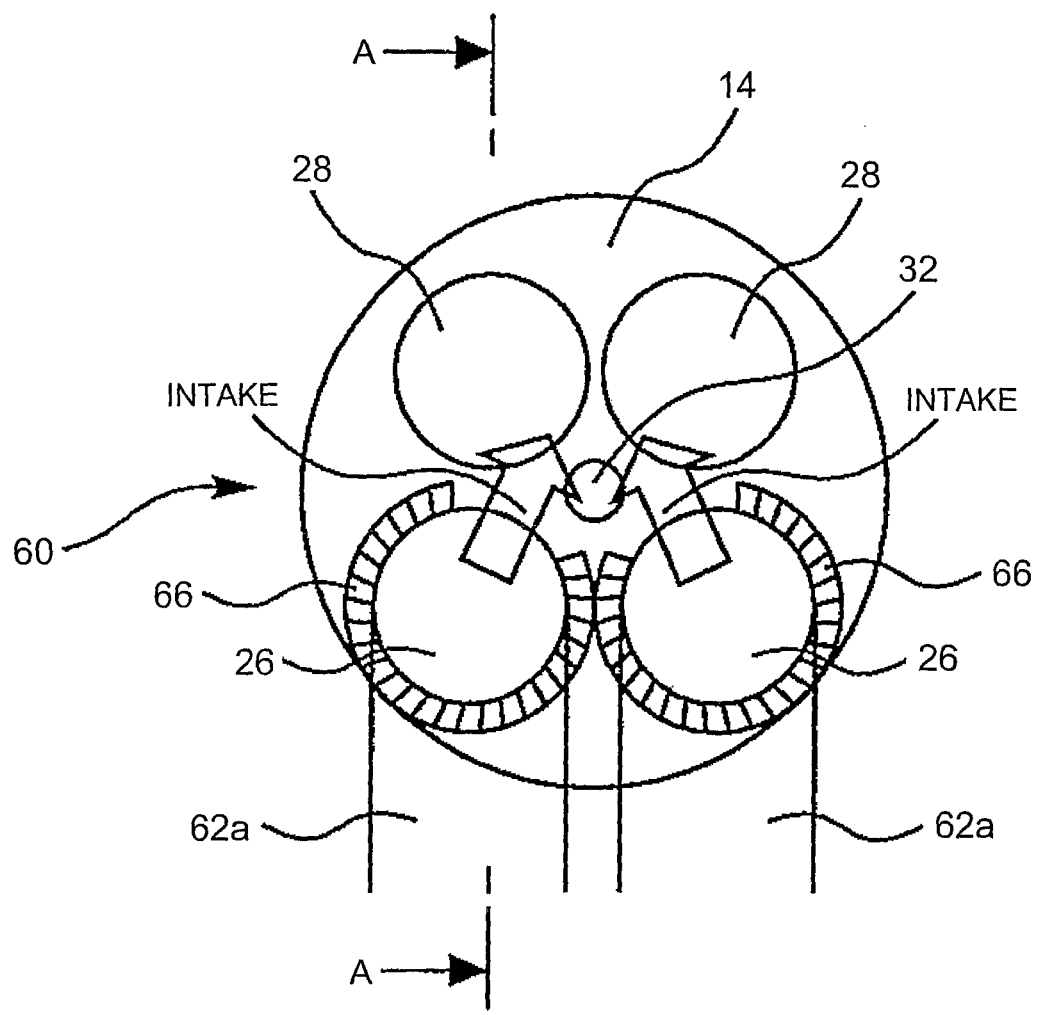
FIG. 20 serves to explain the detailed configuration of the valve mask shown in FIG. 19.

FIG. 20 serves to explain the detailed configuration of the valve mask 66 shown in FIG. 19. FIG. 20 is a view of the combustion chamber 14 taken from below the cylinder. The valve mask 66 is formed on the wall surface of the combustion chamber 14 as a protrusion surrounding the outlet of the intake port 62a, except for a zone on the central side of the combustion chamber 14 (that is, a zone close to the sparkplug 32), for each of the two intake ports 62a provided in each cylinder.

Figure 21:
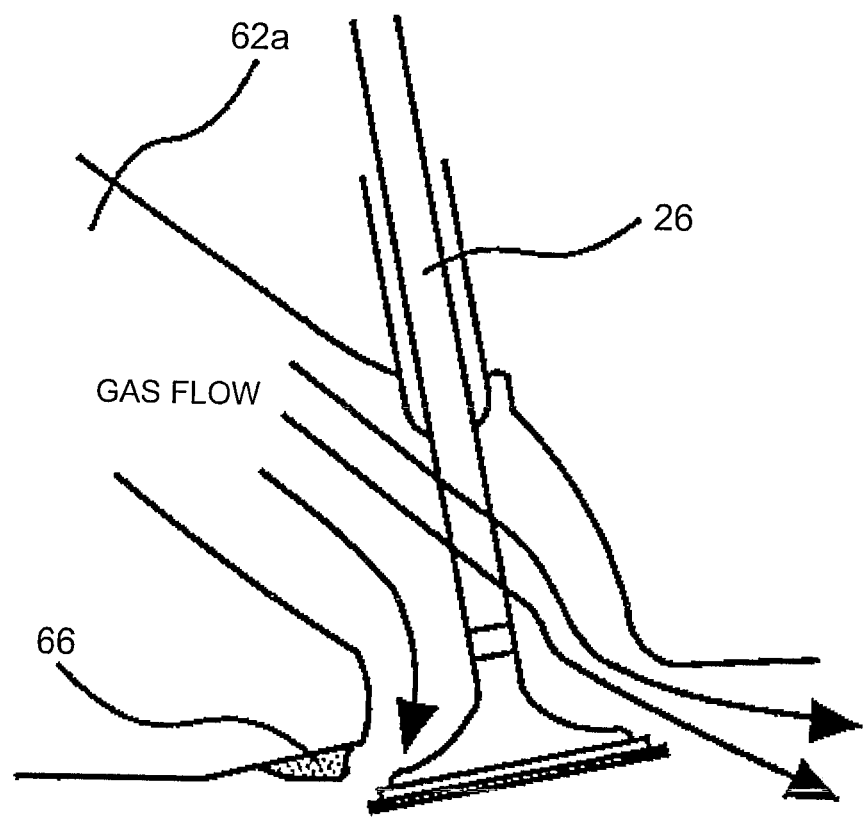
FIG. 21 is a cross-sectional view of the configuration around an intake port, this view being taken along the A-A line in FIG. 20.

The specific portion of the control performed in Embodiment 4 is explained below. FIG. 21 is a cross-sectional view of the configuration around the intake port 62a, this view being taken along the A-A line shown in FIG. 20. As a result of providing the valve mask 66 formed in the above-described manner, as shown in FIG. 21, the intake gas flowing in from the intake port 62a is unlikely to flow toward the zone where the valve mask 66 is provided because of a narrow gap, but easily flows to the zone on the central side of the combustion chamber 14 where the valve mask 66 is not provided. For this reason, the intake gas flowing in from the intake port 62a can be collected on the central side of the combustion chamber 14, as shown by an arrow in FIG. 20. Such a trend is demonstrated more remarkably as the lift amount of the intake valve 26 decreases, since the effect of the valve mask 66 increases. Therefore, where the lift amount of the intake valve 26 is decreased, the intake gas flowing in from the intake port 62a is more actively collected at the central side of the combustion chamber 14. Thus, the combination of the valve mask 66 and the intake variable valve device 64 capable of changing the lift amount of the intake valve 26 constitutes a device affecting the gas flow in the cylinder.

In the internal combustion engine 60 of the above-described configuration, the drift of the vortex center of the tumble flow with respect to the volume center of the combustion chamber 14 in the latter half of the compression stroke can be suppressed by increasing the lift amount of the intake valve 26 and preventing the intake gas flowing in from the intake port 62a from drifting too much to the central side of the combustion chamber 14. As a result, the generation of the tumble flow with the ω tumble shape is suppressed and the tumble flow with the usual tumble shape is generated, and therefore the flow velocity close to the plug at the time of ignition can be increased. Meanwhile, the drift of the vortex center of the tumble flow can be induced by decreasing the lift amount of the intake valve 26 and increasing the ratio of the flow rate of the intake gas toward the zone on the central side of the combustion chamber 14. As a result, the tumble flow with the ω tumble shape is generated, and therefore the flow velocity close to the plug can be reduced by comparison with that when the tumble flow with the usual tumble shape is generated. Further, with such a configuration of the embodiment, the generation and non-generation of the tumble flow with the ω tumble shape can be controlled by using the fact that the directivity of the intake gas, which is determined by the valve mask 66, changes according to the lift amount of the intake valve 26, and increasing or decreasing the ratio of the flow rate of the intake gas toward zone on the central size of the combustion chamber 14. In order to generate effectively the tumble flow with the ω tumble shape when performing control by reducing the lift amount of the intake valve 26, it is preferred that the intake port 62a provided in the internal combustion engine 60 be configured such that a tumble ratio suitable for generating the tumble flow with the ω tumble shape could be obtained (the tumble ratio explained with reference to FIGS. 7A and 7B).

Accordingly, in the embodiment, the tumble flow shape is changed between the usual tumble shape and the ω tumble shape by providing the valve mask 66 formed in the above-described manner, and also by changing the lift amount of the intake valve 26 according to the engine rotation speed by using the intake variable valve device 64 in the lean burn operation region. More specifically, in the region on a low-rotation side within the lean burn operation region (also referred to as the first engine rotation speed region R1), a first lift amount (for example, a maximum lift amount) is selected as the lift amount of the intake valve 26, and in the region on a high-rotation side (also referred to as the second engine rotation speed region R2), a second lift amount, which is less than the first lift amount, is selected as the lift amount of the intake valve 26.

Figure 22A:
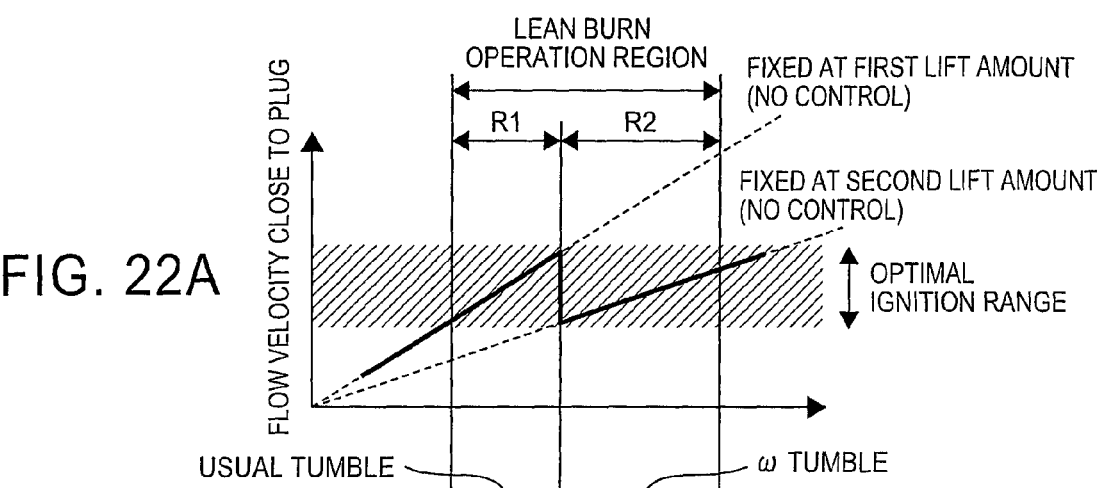
FIGS. 22A and 22B serve to explain a method for controlling the flow velocity close to the plug at the time of ignition by controlling the generation and non-generation of the tumble flow with the ω tumble shape by the valve mask and by changing the lift amount of the intake valve with the intake variable valve device in Embodiment 4.
Figure 22B:
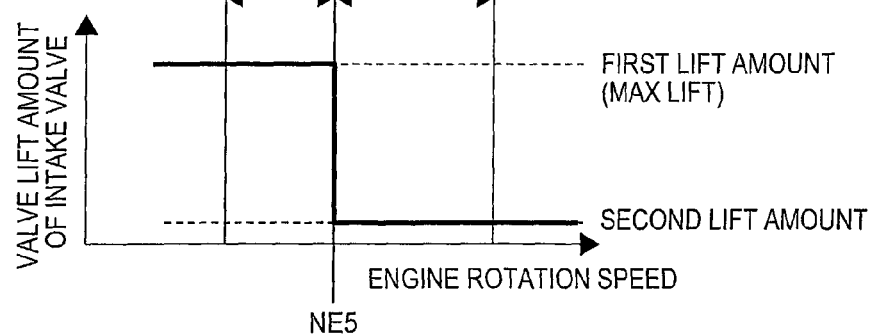

A concrete example of the specific control performed in Embodiment 4 is explained below. FIGS. 22A to 22B serve to explain a method for controlling the flow velocity close to the plug at the time of ignition by controlling the generation and non-generation of the tumble flow with the ω tumble shape by the valve mask 66 and by changing the lift amount of the intake valve 26 with the intake variable valve device 64.

As shown in FIGS. 22A and 22B, where a large first lift amount is used continuously, regardless of the engine rotation speed, the flow velocity close to the plug deviates from the optimal ignition range in the region R2 on the high-rotation side in the lean burn operation region due to the increase in the gas flow velocity that follows the increase in the engine rotation speed. Likewise, where a small second lift amount is continuously used, the flow velocity close to the plug deviates from the optimal ignition range in the region R1 on the low-rotation side.

In the case shown in FIGS. 22A and 22B, in the region R1 on the low-rotation side in the lean burn operation region, the tumble flow with the usual tumble shape can be used and the flow velocity close to the plug can be fit into the optimal ignition range by using the first lift amount. Accordingly, in the embodiment, while a large first lift amount is continuously used, in the engine rotation speed region R1, which is lower than a fifth engine rotation speed NE5 that reaches the upper limit of the optimal ignition range, the first lift amount is selected.

Meanwhile, in the high engine rotation speed R2, which is equal to or higher than the fifth engine rotation speed NE5, a small second lift amount is selected. As a result, the flow velocity close to the plug can be reduced in the vicinity of the fifth engine rotation speed NE5 at which the tumble flow shape is changed, as shown in FIG. 22A, by generating the tumble flow with the ω tumble shape. By so changing the tumble flow shape according to the engine rotation speed, it is possible to maintain the flow velocity close to the plug at the time of ignition in the lean burn operation region within the optimal ignition range. During switching of the valve lift characteristic, the opening degree of the throttle valve 22 is adjusted to cancel changes in the intake air amount.

Further, with the method shown in FIGS. 22A and 22B, in the region R2 on the high-rotation side with respect to the fifth engine rotation speed NE5, a single valve lift characteristic with a small lift amount is used. However, instead of the above-described method, it is also possible to change the lift amount of the intake valve 26 continuously according to the engine rotation speed. Thus, with such a method, the flow velocity close to the plug may be better controlled to obtain the desired value of the flow velocity close to the plug during lean burn operation.

Figure 23:
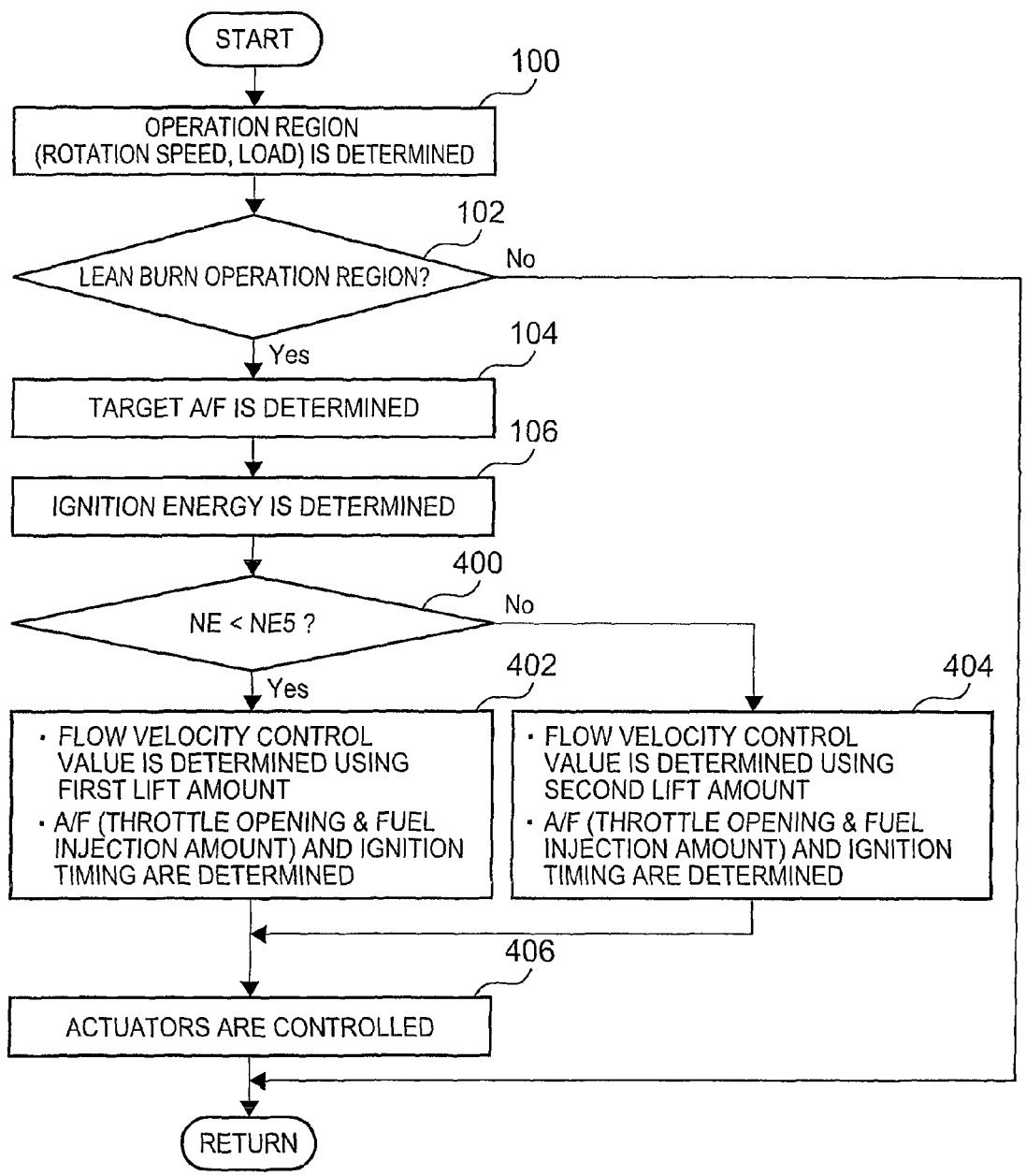
FIG. 23 is a flowchart of the routine executed in Embodiment 4.

FIG. 23 is a flowchart of a control routine executed by the ECU 40 for realizing the specific control of Embodiment 4 of the invention. In FIG. 23, steps same as those in FIG. 18 relating to Embodiment 3 are assigned with the same reference numerals and the explanation thereof is herein omitted or simplified.

In the routine shown in FIG. 23, the ECU 40 determines the ignition energy in step 106 and then determines whether or not the present engine rotation speed NE is lower than the fifth engine rotation speed NE5 (step 400). As mentioned hereinabove, the fifth engine rotation speed NE5 is a threshold for changing the tumble flow shape according to the engine rotation speed in the lean burn operation region.

Where a positive determination is made in step 400 (NE<NE5), the ECU 40 selects the first lift amount at which a large lift amount is obtained as a flow velocity control value (target lift amount), and determines, according a predetermined map or the like, the target values of throttle opening degree, fuel injection amount, and ignition timing for realizing the required torque at the target A/F (step 402). Meanwhile, where a negative determination is made in step 400 (NE≥NE5), the ECU 40 selects the second lift amount at which a small lift amount is obtained as a flow velocity control value (target lift amount), and determines, according a predetermined map or the like, the target values of throttle opening degree, fuel injection amount, and ignition timing for realizing the required torque at the target A/F (step 404). Then, the ECU 40 controls the actuators (throttle valve 22, fuel injection valve 30, sparkplug 32, and intake variable valve device 64) according to the respective determined target values (step 406).

With the above-described routine shown in FIG. 23, the flow velocity close to the plug at the time of ignition in the lean burn operation region can be maintained within the optimal ignition range, regardless of the value of the engine rotation speed, by changing the tumble flow shape between the usual tumble shape and the ω tumble shape according to the engine rotation speed by using the combination of the valve mask 66 and the control of the lift amount of the intake valve 26. Further, with the method for controlling the tumble flow of the embodiment, the presence/absence of the drift of the vortex center of tumble flow (tumble shape) can be controlled without relying on the control of the tumble ratio itself (that is, without weakening the turbulence of in-cylinder gas which is important for combustion). Therefore, the ignition ability of the air-fuel mixture during lean burn operation can be improved while ensuring the expansion of a lean limit (improving fuel efficiency).

In the above-described Embodiment 4, the "electronic control unit" according to the first to sixth aspects of the invention is realized by executing the processing of steps 400 to 406 with the ECU 40.

Figure 24:
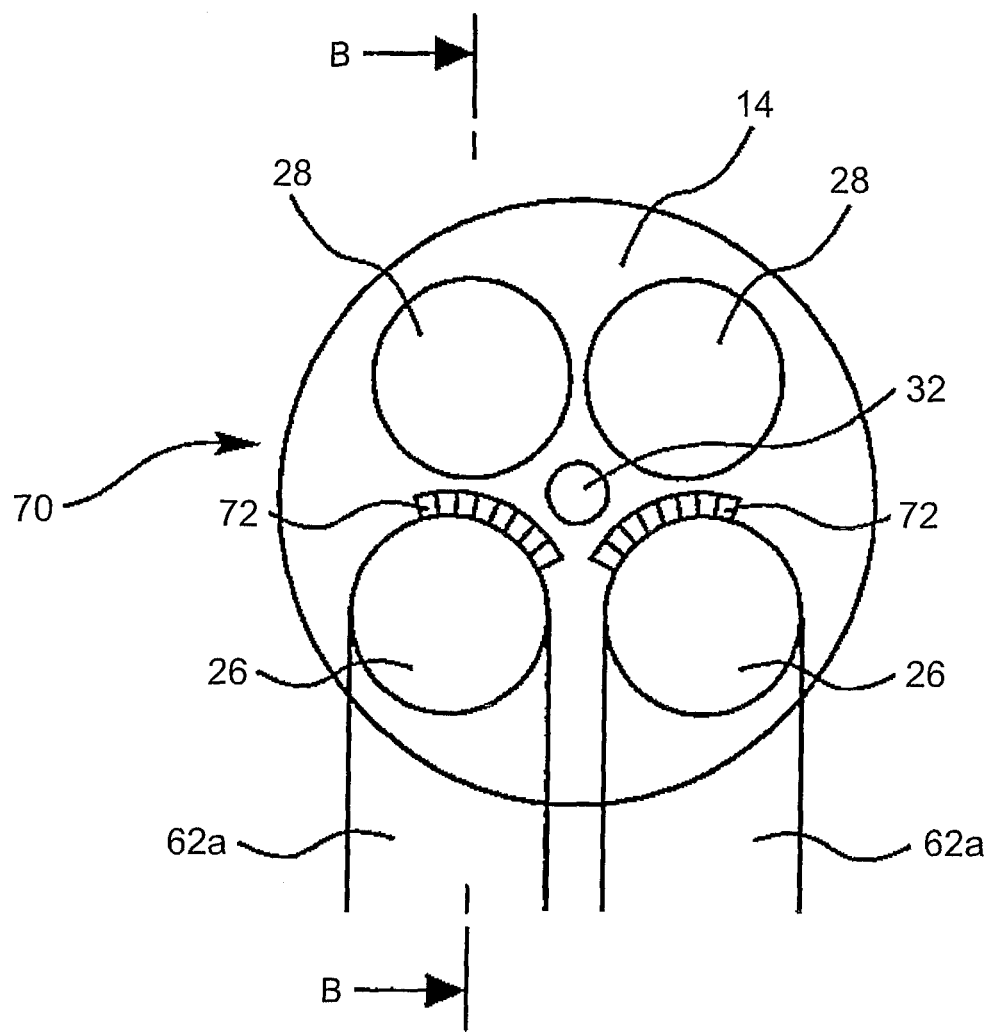
FIG. 24 is a schematic diagram for explaining the detailed configuration of the valve mask provided in the internal combustion engine of Embodiment 5 of the invention.

Embodiment 5 of the invention will be described below with reference to FIGS. 24 to 27. [Explanation of System Configuration] FIG. 24 is a schematic diagram for explaining the detailed configuration of the valve mask 72 provided in an internal combustion engine 70 of Embodiment 5 of the invention.

The internal combustion engine 70 of the embodiment is configured in the same manner as the above-described internal combustion engine 60, except that a valve mask 72 is provided instead of the valve mask 66. The valve mask 72 in the embodiment is formed as a protrusion surrounding an outlet of the intake port 62a on the wall surface of the combustion chamber 14 only in a zone on the central side of the combustion chamber 14 (zone close to the sparkplug 32) for each of the two intake ports 62a provided in each cylinder.

Figure 25:
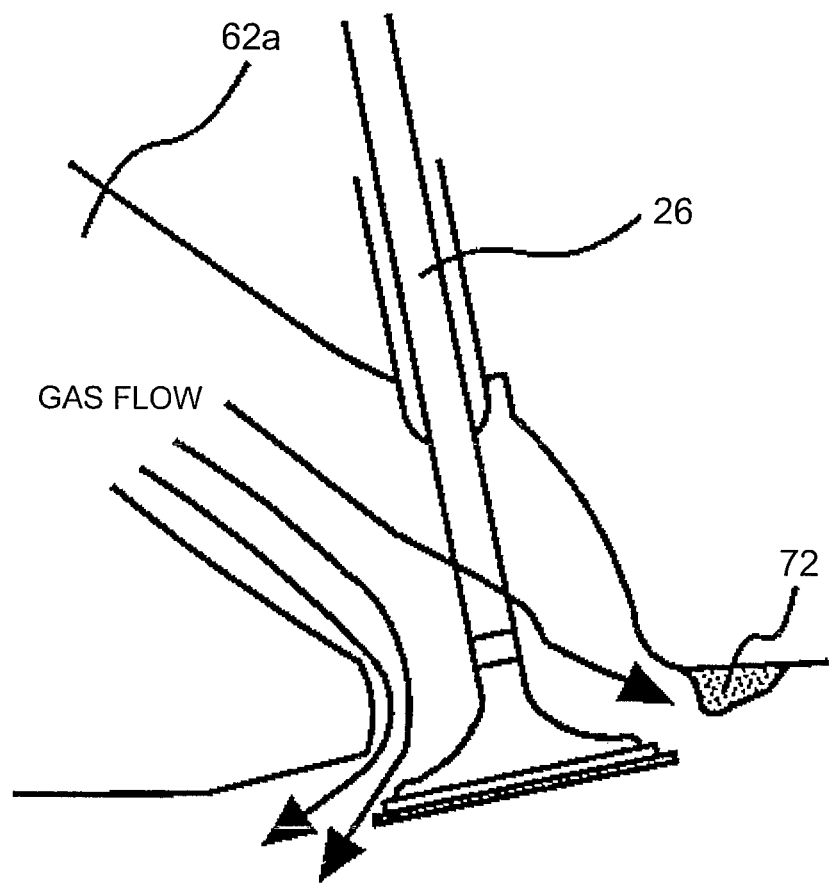
FIG. 25 is a cross-sectional view of the configuration around an intake port, this view being taken along the B-B line in FIG. 24.
Figure 26:
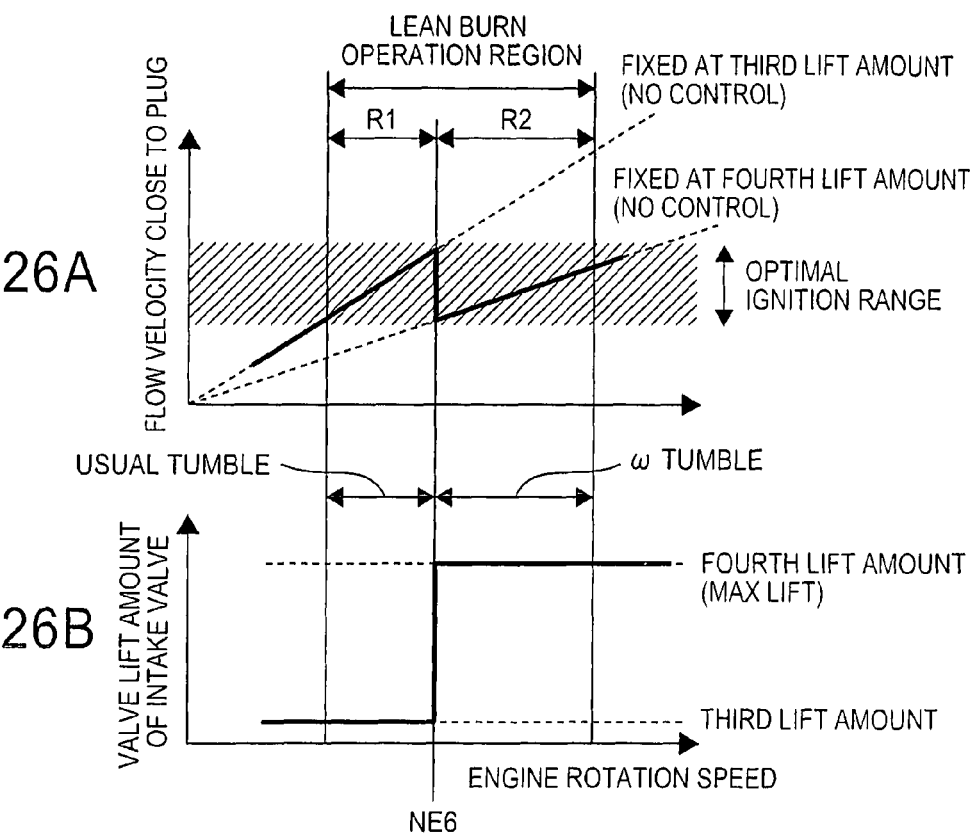
FIGS. 26A and 26B serve to explain a method for controlling the flow velocity close to the plug at the time of ignition by controlling the generation and non-generation of the tumble flow with the ω tumble shape by the valve mask and by changing the lift amount of the intake valve with the intake variable valve device in Embodiment 5.

The specific portion of the control performed in Embodiment 5 will be explained below. FIG. 25 is a cross-sectional view of the configuration around the intake port 62a this view being taken along the B-B line shown in FIG. 24. As a result of providing the valve mask 72 formed in the above-described manner, as shown in FIG. 25, the intake gas flowing in from the intake port 62a is unlikely to flow toward the zone on the central side of the combustion chamber 14 where the valve mask 72 is provided because of a narrow gap, but easily flows to the remaining zone where the valve mask 72 is not provided. Such a trend is demonstrated more remarkably as the lift amount of the intake valve 26 decreases since the effect of the valve mask 72 increases. In other words, by increasing the lift amount of the intake valve 26, it is possible to increase the ratio of the flow rate of the intake gas toward the central side of the combustion chamber 14 in the intake gas flowing from the intake port 62a by comparison with the case in which the lift amount of the intake valve 26 is relatively small.

In the internal combustion engine 70 of the above-described configuration, the drift of the vortex center of the tumble flow with respect to the volume center of the combustion chamber 14 in the latter half of the compression stroke can be suppressed by decreasing the lift amount of the intake valve 26 and preventing the intake gas flowing in from the intake port 62a from drifting too much to the central side of the combustion chamber 14. As a result, the generation of the tumble flow with the ω tumble shape is suppressed and the tumble flow with the usual tumble shape is generated, and therefore the flow velocity close to the plug at the time of ignition can be increased. Meanwhile, the drift of the vortex center of the tumble flow can be induced by increasing the lift amount of the intake valve 26 and increasing the ratio of the flow rate of the intake gas toward the zone on the central side of the combustion chamber 14. As a result, the tumble flow with the ω tumble shape is generated, and therefore the flow velocity close to the plug can be reduced by comparison with that when the tumble flow with the usual tumble shape is generated. Further, according to the configuration of the embodiment, the generation and non-generation of the tumble flow with the ω tumble shape can be also controlled by using the fact that the directivity of the intake gas, which is determined by the valve mask 72, changes according to the lift amount of the intake valve 26, and increasing or decreasing the ratio of the flow rate of the intake gas toward zone on the central size of the combustion chamber 14. In order to generate effectively the tumble flow with the ω tumble shape when performing control by increasing the lift amount of the intake valve 26, it is preferred that the intake port 62a provided in the internal combustion engine 70 be configured such that a tumble ratio suitable for generating the tumble flow with the ω tumble shape could be obtained (the tumble ratio explained with reference to FIGS. 7A and 7B).

Accordingly, in the embodiment, the tumble flow shape is changed between the usual tumble shape and the ω tumble shape by providing the valve mask 72 formed in the above-described manner, and also by changing the lift amount of the intake valve 26 according to the engine rotation speed by using the intake variable valve device 64 in the lean burn operation region. More specifically, in the region on a low-rotation side within the lean burn operation region (also referred to as the first engine rotation speed region R1), a third lift amount is selected as the lift amount of the intake valve 26, and in the region on a high-rotation side (also referred to as the second engine rotation speed region R2), a fourth lift amount (for example, a maximum lift amount), which is larger than the third lift amount, is selected as the lift amount of the intake valve 26.

A concrete example of the specific control performed in Embodiment 5 is explained below. FIGS. 26A to 26B serve to explain a method for controlling the flow velocity close to the plug at the time of ignition by controlling the generation and non-generation of the tumble flow with the ω tumble shape by the valve mask 72 and by changing the lift amount of the intake valve 26 with the intake variable valve device 64.

As shown in FIGS. 26A and 26B, where a small third lift amount is used continuously, regardless of the engine rotation speed, the flow velocity close to the plug deviates from the optimal ignition range in the region R2 on the high-rotation side in the lean burn operation region due to the increase in the gas flow velocity that follows the increase in the engine rotation speed. Likewise, where a large fourth lift amount is continuously used, the flow velocity close to the plug deviates from the optimal ignition range in the region on the low-rotation side.

In the case shown in FIGS. 26A and 26B, in the region R1 on the low-rotation side in the lean burn operation region, the tumble flow with the usual tumble shape can be used and the flow velocity close to the plug can be fit into the optimal ignition range by using the third lift amount. Accordingly, in the embodiment, while a small third lift amount is continuously used, in the engine rotation speed region R1, which is lower than a sixth engine rotation speed NE6 that reaches the upper limit of the optimal ignition range, the third lift amount is selected.

Meanwhile, in the high engine rotation speed R2, which is equal to or higher than the sixth engine rotation speed NE6, a large fourth lift amount is selected. As a result, the flow velocity close to the plug can be reduced in the vicinity of the sixth engine rotation speed NE6 at which the tumble flow shape is changed, as shown in FIG. 26A, by generating the tumble flow with the ω tumble shape. By so changing the tumble flow shape according to the engine rotation speed, it is possible to maintain the flow velocity close to the plug at the time of ignition in the lean burn operation region within the optimal ignition range. During switching of the valve lift characteristic, the opening degree of the throttle valve 22 is adjusted to cancel changes in the intake air amount.

Further, with the method shown in FIGS. 26A and 26B, in the region R2 on the high-rotation side with respect to the sixth engine rotation speed NE6, a single valve lift characteristic with a large lift amount is used. However, instead of the above-described method, it is also possible to change the lift amount of the intake valve 26 continuously according to the engine rotation speed. Thus, with such a method, the flow velocity close to the plug may be better controlled to obtain the desired value of the flow velocity close to the plug during lean burn operation.

Figure 27:
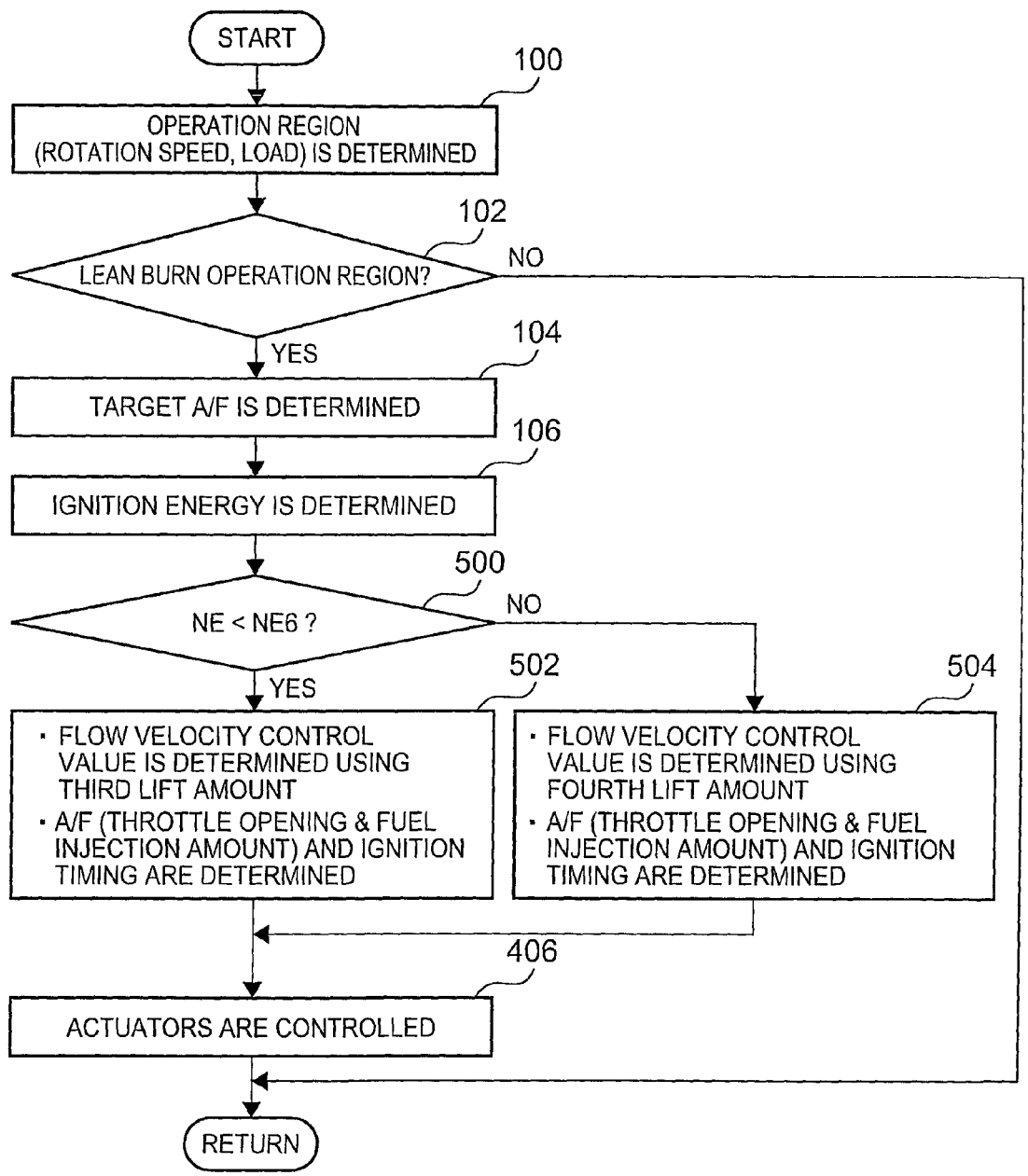
FIG. 27 is a flowchart of the routine executed in Embodiment 5.

FIG. 27 is a flowchart of a control routine executed by the ECU 40 for realizing the specific control of Embodiment 5 of the invention. In FIG. 27, steps same as those in FIG. 23 relating to Embodiment 4 are assigned with the same reference numerals and the explanation thereof is herein omitted or simplified.

In the routine shown in FIG. 27, the ECU 40 determines the ignition energy in step 106 and then determines whether or not the present engine rotation speed NE is lower than the sixth engine rotation speed NE6 (step 500). As mentioned hereinabove, the sixth engine rotation speed NE6 is a threshold for changing the tumble flow shape according to the engine rotation speed in the lean burn operation region.

Where a positive determination is made in step 500 (NE<NE6), the ECU 40 selects the third lift amount at which a small lift amount is obtained as a flow velocity control value (target lift amount), and determines, according a predetermined map or the like, the target values of throttle opening degree, fuel injection amount, and ignition timing for realizing the required torque at the target A/F (step 502). Meanwhile, where a negative determination is made in step 500 (NE≥NE6), the ECU 40 selects the fourth lift amount at which a large lift amount is obtained as a flow velocity control value (target lift amount), and determines, according a predetermined map or the like, the target values of throttle opening degree, fuel injection amount, and ignition timing for realizing the required torque at the target A/F (step 504).

With the above-described routine shown in FIG. 27, the flow velocity close to the plug at the time of ignition in the lean burn operation region also can be maintained within the optimal ignition range, regardless of the value of the engine rotation speed, by changing the tumble flow shape between the usual tumble shape and the ω tumble shape according to the engine rotation speed by using the combination of the valve mask 72 and the control of the lift amount of the intake valve 26. Further, with the method for controlling the tumble flow of the embodiment, the presence/absence of the drift of the vortex center of tumble flow (tumble shape) can be controlled without relying on the control of the tumble ratio itself (that is, without weakening the turbulence of in-cylinder gas which is important for combustion). Therefore, the ignition ability of the air-fuel mixture during lean burn operation can be improved while ensuring the expansion of a lean limit (improving fuel efficiency).

In the above-described Embodiment 5, the "electronic control unit" according to the first to fifth and also seventh aspects of the invention is realized by executing the processing of steps 500 to 504 and 406 with the ECU 40.

In the above-described Embodiments 1 to 5, the control is explained by which the flow velocity close to the plug at the time of ignition in the lean burn operation region is fitted into the optimal ignition range by changing the tumble flow shape between the usual tumble shape and the ω tumble shape according to the engine rotation speed. However, the tumble flow control in accordance with the invention is not limited to changing the tumble flow shape between the usual tumble shape and the ω tumble shape according to the engine rotation speed so as to fit the flow velocity close to the plug at the time of ignition in the lean burn operation region into the optimal ignition range. Thus, the tumble flow control in accordance with the invention may involve simply changing the tumble flow shape between the usual tumble shape and the ω tumble shape according to the engine rotation speed, without including the feature of actively controlling the flow velocity close to the plug to within the optimal ignition range. More specifically, as has already been descried in the embodiments, changing the tumble flow shape between the usual tumble shape and the ω tumble shape according to the engine rotation speed in a certain engine rotation speed region demonstrates the effect of suppressing a change of the flow velocity close to the plug at the time of ignition in this engine rotation speed region by comparison with the case in which the tumble shape is not changed. Therefore, by providing only the feature of changing the tumble flow shape between the usual tumble shape and the ω tumble shape according to the engine rotation speed, it is possible to provide a controller for an internal combustion engine that contributes to the improvement of ignition ability of the air-fuel mixture during lean burn operation which is performed under the condition of a low fuel concentration in the air-fuel mixture.

In the case in which the reversal timing of the gas flow direction around the sparkplug 32 at the time of generation of the tumble flow with the ω tumble shape is after the setting range of the ignition timing during the lean burn operation, as is presumed in the above-described Embodiments 1 to 5, the increase in the drift degree of the vortex center of the tumble flow and the strengthening of the flow with the ω tumble shape result in a decreased flow velocity close to the plug at the time of ignition. By contrast, in the case in which the reversal timing of the gas flow direction is before the setting range of the ignition timing during the lean burn operation, the strengthening of the flow with the ω tumble shape acts to increase the flow velocity close to the plug at the time of ignition. However, the gas flow direction in this case is reversed. In the invention, the feature of changing the tumble flow shape between the usual tumble shape (also referred to as the first tumble shape) and the ω tumble shape (also referred to as the second tumble shape) according to the engine rotation speed may be also used in an internal combustion engine is which the latter case is assumed.

Further, in the above-described Embodiments 1 to 5, the internal combustion engine 10 equipped with two intake valves 26 per one cylinder is explained by way of example, but the invention may be also applied to an internal combustion engine configured to have two or more intake valves per one cylinder, provided that an intake valve and an exhaust valve are disposed such that a sparkplug is interposed therebetween.

The invention claimed is:
1. A controller for an internal combustion engine, the internal combustion engine including:
a combustion chamber; and
a sparkplug disposed in the vicinity of a center portion of an upper wall surface of the combustion chamber, the sparkplug being configured to ignite air-fuel mixture, wherein
tumble flow is generated inside a cylinder of the combustion chamber during lean burn operation,
the controller comprising:
an electronic control unit configured to change a shape of the tumble flow between a first tumble shape and a second tumble shape according to an engine rotation speed, the first tumble shape being provided such that flow direction of gas around the sparkplug at the time of ignition of the internal combustion engine is direction from an intake valve side toward an exhaust valve side in a latter half of compression stroke, and the second tumble shape being provided such that the flow direction of the gas is reversed in the latter half of the compression stroke from the direction from the intake valve side toward the exhaust valve side to direction from the exhaust valve side toward the intake valve side due to change to the tumble flow having two swirling flow components with mutually opposite rotation directions, as viewed from above the combustion chamber, in a process in which an in-cylinder gas is compressed in the compression stroke,
wherein the electronic control unit is configured to change the shape of the tumble flow to the second tumble shape by increasing a drift of a vortex center of the tumble flow in the vicinity of a cross section passing through a cylinder bore center of the combustion chamber in intake-exhaust direction in the latter half of the compression stroke of the internal combustion engine with respect to a volume center of the combustion chamber.
2. The controller according to claim 1, wherein
the electronic control unit is configured to control gas flow velocity around the sparkplug at the time of ignition to within a predetermined flow velocity range by changing the shape of the tumble flow between the first tumble shape and the second tumble shape according to the engine rotation speed.
3. The controller according to claim 1, wherein
the electronic control unit is configured to change the shape of the tumble flow to the first tumble shape in a first engine rotation speed region, and
the electronic control unit is configured to change the shape of the tumble flow to the second tumble shape in a second engine rotation speed region, the second engine rotation speed region being an engine rotation speed region higher than the first engine rotation speed region.
4. The controller according to claim 1, wherein
the electronic control unit is configured to increase the drift with respect to the volume center of the combustion chamber as the engine rotation speed is high, when the second tumble shape is generated in a second engine rotation speed region.
5. A controller for an internal combustion engine, the internal combustion engine including:
a combustion chamber; and
a sparkplug disposed in the vicinity of a center portion of an upper wall surface of the combustion chamber, the sparkplug being configured to ignite air-fuel mixture, wherein
tumble flow is generated inside a cylinder of the combustion chamber during lean burn operation,
the controller comprising:
an electronic control unit configured to change a shape of the tumble flow between a first tumble shape and a second tumble shape according to an engine rotation speed, the first tumble shape being provided such that flow direction of gas around the sparkplug at the time of ignition of the internal combustion engine is direction from an intake valve side toward an exhaust valve side in a latter half of compression stroke, and the second tumble shape being provided such that the flow direction of the gas is reversed in the latter half of the compression stroke from the direction from the intake valve side toward the exhaust valve side to direction from the exhaust valve side toward the intake valve side due to change to the tumble flow having two swirling flow components with mutually opposite rotation directions, as viewed from above the combustion chamber, in a process in which an in-cylinder gas is compressed in the compression stroke, wherein
the electronic control unit is configured to change the shape of the tumble flow to the second tumble shape by increasing a ratio of flow rate of intake gas from an intake port toward a center portion of the combustion chamber in the flow rate of the intake gas flowing into the combustion chamber in an intake stroke of the internal combustion engine.
6. The controller according to claim 5, wherein
the internal combustion engine is provided with an intake variable valve device, the intake variable valve device is configured to change a lift amount of the intake valve,
a protrusion is provided on a wall surface of the combustion chamber so as to surround an outlet of the intake port, except a zone on central side of the combustion chamber, and
the electronic control unit is configured to control the intake variable valve device so that when the engine rotation speed is high, the lift amount of the intake valve is less compared with the lift amount of the intake valve when the engine rotation speed is low.
7. The controller according to claim 6, wherein
the electronic control unit is configured to control the intake variable valve device so that when the engine rotation speed is high, the lift amount of the intake valve is a predetermined lift amount less compared with the lift amount of the intake valve when the engine rotation speed is low.
8. The controller according to claim 6, wherein
the electronic control unit is configured to control the intake variable valve device so that when the engine rotation speed is high, the lift amount of the intake valve continuously decreases to a lift amount less compared with the lift amount of the intake valve when the engine rotation speed is low, as the engine rotation speed increases.
9. The controller according to claim 5, wherein
the internal combustion engine is provided with an intake variable valve device, the intake variable valve device is configured to change a lift amount of the intake valve, a protrusion is provided on a wall surface of the combustion chamber so as to surround an outlet of the intake port in a zone on central side of the combustion chamber, and the electronic control unit is configured to control the intake variable valve device so that when the engine rotation speed is high, the lift amount of the intake valve is larger compared with the lift amount of the intake valve when the engine rotation speed is low.

10. The controller according to claim 9, wherein the electronic control unit is configured to control the intake variable valve device so that when the engine rotation speed is high, the lift amount of the intake valve is a predetermined lift amount that is larger compared with the lift amount of the intake valve when the engine rotation speed is low.

11. The controller according to claim 9, wherein the electronic control unit is configured to control the intake variable valve device so that when the engine rotation speed is high, the lift amount of the intake valve continuously increases to a lift amount larger compared with the lift amount of the intake valve when the engine rotation speed is low, as the engine rotation speed increases.

12. A controller for an internal combustion engine, the internal combustion engine including:

a combustion chamber; and a sparkplug disposed in the vicinity of a center portion of an upper wall surface of the combustion chamber, the sparkplug being configured to ignite air-fuel mixture, wherein tumble flow is generated inside a cylinder of the combustion chamber during lean burn operation, the controller comprising:

an electronic control unit configured to change a shape of the tumble flow between a first tumble shape and a second tumble shape according to an engine rotation speed, the first tumble shape being provided such that flow direction of gas around the sparkplug at the time of ignition of the internal combustion engine is direction from an intake valve side toward an exhaust valve side in a latter half of compression stroke, and the second tumble shape being provided such that the flow direction of the gas is reversed in the latter half of the compression stroke from the direction from the intake valve side toward the exhaust valve side to direction from the exhaust valve side toward the intake valve side due to change to the tumble flow having two swirling flow components with mutually opposite rotation directions, as viewed from above the combustion chamber, in a process in which an in-cylinder gas is compressed in the compression stroke, wherein the second tumble shape is generated when a reversal timing of the gas flow direction is after the ignition timing of the sparkplug, the internal combustion engine is provided with an intake variable valve device, the intake variable valve device being configured to change a time period with a maximum valve lift among the lift amounts of the intake valve; and the electronic control unit is configured to control the intake variable valve device so that when the engine rotation speed is high, the time period with the maximum valve lift is shorter compared with the time period with the maximum valve lift when the engine rotation speed is low.

13. The controller according to claim 12, wherein the electronic control unit is configured to control the intake variable valve device so that when the engine rotation speed is high, the time period with the maximum valve lift is a predetermined period of time that is shorter compared with the time period with the maximum valve lift when the engine rotation speed is low.

14. The controller according to claim 12, wherein the electronic control unit is configured to control the intake variable valve device so that when the engine rotation speed is high, the time period with the maximum valve lift continuously decreases to a period of time that is shorter compared with the time period with the maximum valve lift when the engine rotation speed is low, as the engine rotation speed increases.

* * * * *